(12) United States Patent
Satomi et al.

(10) Patent No.: US 7,333,576 B2
(45) Date of Patent: Feb. 19, 2008

(54) DIGITAL DEMODULATION DEVICE AND SYNCHRONIZATION DETECTING METHOD

(75) Inventors: Toshiyuki Satomi, Osaka (JP); Naoya Tokunaga, Osaka (JP); Takaaki Konishi, Osaka (JP); Hisaya Kato, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 736 days.

(21) Appl. No.: 10/342,218

(22) Filed: Jan. 15, 2003

(65) Prior Publication Data

US 2003/0161423 A1    Aug. 28, 2003

(30) Foreign Application Priority Data

Feb. 22, 2002  (JP) ............................. 2002-045998

(51) Int. Cl.
| | |
|---|---|
| *H04B 1/10* | (2006.01) |
| *H03H 7/30* | (2006.01) |
| *H03H 7/40* | (2006.01) |
| *H04L 7/00* | (2006.01) |
| *H04N 5/04* | (2006.01) |

(52) U.S. Cl. ...................... 375/350; 375/229; 375/354; 348/425.4; 348/500; 348/513

(58) Field of Classification Search ................ 348/507, 348/508, 914, 536, 607, 611, 614, 624, 638, 348/639, 726, 727, 731, 735, 512–513, 464, 348/467, 423.1, 425.2, 500; 375/229–232, 375/233, 348, 350, 321, 231, 326, 339, 355, 375/346, 327, 371, 376; 360/65; 455/47, 455/204; 708/300–301, 307–308
See application file for complete search history.

(56) References Cited

U.S. PATENT DOCUMENTS 3,573,623 A * 4/1971 Bannon et al. ............. 375/231
3,851,100 A * 11/1974 Herzog ........................ 348/497
4,004,226 A * 1/1977 Qureshi et al. ............. 375/231

(Continued)

FOREIGN PATENT DOCUMENTS

JP          5-75498        3/1993

(Continued)

OTHER PUBLICATIONS

Japanese Office Action issued in corresponding Japanese Paten Application No. JP 2002-045998, dated Oct. 24, 2006.

*Primary Examiner*—Mohammed Ghayour
*Assistant Examiner*—Sophia Vlahos
(74) *Attorney, Agent, or Firm*—McDermott Will & Emery

(57) ABSTRACT

A synchronization error occurs when a DTV signal is distorted on a transmission path and this deteriorates demodulation capability. The digital demodulation device and the synchronization detecting method of the invention can correct the synchronization position when determining that a synchronization error has occurred. A controller receives a center tap coefficient, for example, from a waveform equalizer and compares the coefficient with a given center tap coefficient threshold. If the coefficient is smaller than the threshold, the controller determines that a synchronization detector has made a synchronization error and outputs a control signal. The synchronization detector receiving the control signal re-detects a sync signal included in a received signal, to detect a new correct sync signal and thus correct the synchronization error.

12 Claims, 21 Drawing Sheets

U.S. PATENT DOCUMENTS

| | | | |
|---|---|---|---|
| 4,575,857 A * | 3/1986 | Murakami | 375/230 |
| 4,815,103 A * | 3/1989 | Cupo et al. | 375/234 |
| 5,228,060 A * | 7/1993 | Uchiyama | 375/316 |
| 5,285,475 A * | 2/1994 | Kurokami | 375/233 |
| 5,517,524 A * | 5/1996 | Sato | 375/230 |
| 5,517,526 A * | 5/1996 | Caudron et al. | 375/232 |
| 5,677,935 A * | 10/1997 | Karino | 375/368 |
| 5,886,748 A * | 3/1999 | Lee | 348/614 |
| 5,991,349 A * | 11/1999 | Chen | 375/355 |
| 6,081,301 A | 6/2000 | Limberg | |
| 6,104,770 A * | 8/2000 | Yama | 375/368 |
| 6,124,898 A | 9/2000 | Patel et al. | |
| 6,141,378 A * | 10/2000 | d'Oreye de Lantremange | 375/232 |
| 6,275,554 B1 * | 8/2001 | Bouillet et al. | 375/371 |
| 6,411,650 B1 * | 6/2002 | Okita | 375/232 |
| 6,693,958 B1 * | 2/2004 | Wang et al. | 375/323 |
| 6,804,695 B1 * | 10/2004 | Hsu | 708/322 |
| 6,816,548 B1 * | 11/2004 | Shiue et al. | 375/233 |
| 2002/0097823 A1 * | 7/2002 | Kobayashi et al. | 375/355 |

FOREIGN PATENT DOCUMENTS

JP  8-96312  4/1996

* cited by examiner

FIG. 9
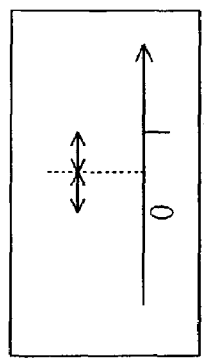
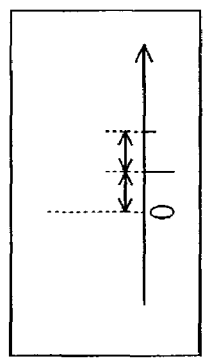
+
+
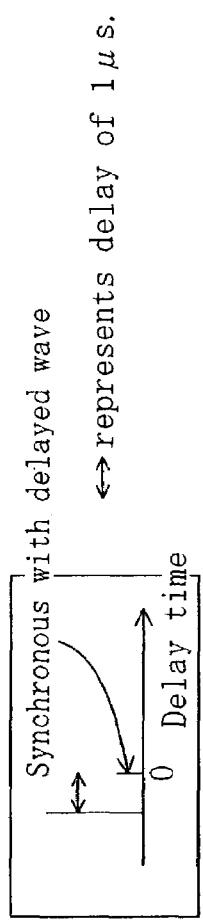
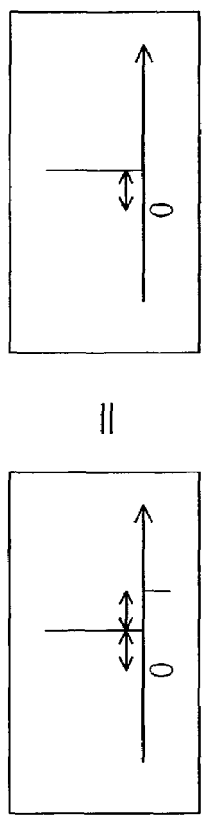
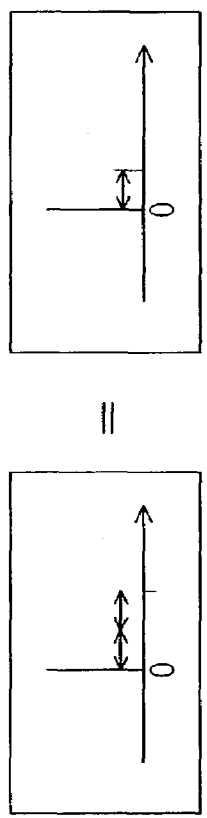
FIG. 9A
Received signal
FIG. 9B
Tap coefficient
FIG. 9C
Output signal

DIGITAL DEMODULATION DEVICE AND SYNCHRONIZATION DETECTING METHOD

BACKGROUND OF THE INVENTION

The present invention relates to a technology of synchronization detection of a digital signal, and more particularly, to a technology of detection of a sync signal included in a digital TV (DTV) signal transmitted from a broadcasting station.

Initially, digital broadcasting was developed mainly for satellite broadcasting. In recent years, however, the trend of digitization has also surged into terrestrial broadcasting. In terrestrial broadcasting, a DTV signal transmitted from a broadcasting station undergoes a greater distortion on a transmission path than in satellite broadcasting.

FIG. 19 illustrates an example of multipath interference typical in terrestrial broadcasting, which is one kind of distortion a signal undergoes on a transmission path. In FIG. 19, a broadcasting station 1901 transmits a DTV signal, and an antenna 1903 for a DTV receiver 1904 receives the DTV signal transmitted from the broadcasting station 1901. The reference numeral 1902 is an obstacle reflecting the DTV signal transmitted from the broadcasting station 1901.

Among DTV signals received by the antenna 1903, a DTV signal directly received from the broadcasting station 1901 in good reception state is a desired signal. For example, a DTV signal W1 is a desired signal. A DTV signal received under bad reception conditions, such as being reflected from the obstacle 1902, is a delayed signal. For example, a DTV signal W2 is a delayed signal. In general, a delayed signal includes a signal delayed in phase behind a desired signal because the transmission distance is longer than that of the desired signal, and a signal reduced in amplitude due to loss of part of energy during reflection from the obstacle 1902.

The antenna 1903 receives both the desired signal W1 and the delayed signal W2. Therefore, a DTV signal input into the DTV receiver 1904 is a composite signal of the desired signal W1 and the delayed signal W2, and thus has a distortion. This phenomenon that the received signal has a distortion because it is a composite of signals received via a plurality of transmission paths is called multipath interference.

FIG. 20 shows a received signal subjected to multipath interference. In FIG. 20, a received signal DT1 is a distorted composite signal of the desired signal W1 and the delayed signal W2.

A digital demodulation device of the DTV receiver 1904 attempts to decrease the distortion of the received signal to demodulate a DTV signal of the desired signal. FIG. 21 shows a configuration of a conventional digital demodulation device, which includes a synchronization detector 101, a waveform equalizer 102 and an error corrector 103. The synchronization detector 101 detects synchronization of the received signal DT1. The waveform equalizer 102 reduces the distortion of the received signal DT1 based on a sync timing signal DT2 output from the synchronization detector 101. The error corrector 103 corrects a code error of a DTV signal DT3 waveform-equalized by the waveform equalizer 102. Data DT4 error-corrected by the error corrector 103 is output to a circuit subsequent to the digital demodulation device in the DTV receiver 1904, to be subjected to processing for image display.

A DTV signal is essentially composed of predetermined data units (segments) each headed by a sync signal representing the timing for synchronization (A or A' in FIG. 20). The synchronization detector 101 detects the sync signal from the received signal DT1 and outputs the sync timing signal DT2 at the same timing as that of the sync signal.

Synchronization detection is an especially important function in determining the performance of the DTV receiver 1904. Currently, fierce competition on the performance of the DTV receiver is underway, and thus further improvement in performance is requested.

The synchronization detector 101 normally captures the sync signal included in the desired signal W1 (A in FIG. 20) for detection of synchronization (2001 in FIG. 20). However, if the amplitude of the delayed signal W2 included in the received signal DT1 is particularly large, the sync signal included in the delayed signal W2 (A' in FIG. 20) may be captured (2002 in FIG. 20).

If the synchronization detector 101 detects the sync signal of the delayed signal W2, that is, if a synchronization error occurs, the sync timing signal DT2 is output at the timing of the sync signal included in the DTV signal of the delayed signal W2. The wave equalizer 102 operates based on this sync timing signal DT2 and thus attempts to remove the desired signal W1. However, it is difficult to completely remove the desired signal W1 because the energy of the desired signal W1 is greater than that of the delayed signal W2. As a result, the waveform-equalized DTV signal DT3 includes too many errors to be corrected by the error corrector 103.

SUMMARY OF THE INVENTION

An object of the present invention is providing a digital demodulation device capable of detecting a correct synchronization position from a received signal having a distortion due to multipath interference and the like.

Another object of the present invention is providing a synchronization detecting method for detecting a correct synchronization position from such a received signal.

The digital demodulation device of the present invention includes: a synchronization detector for detecting a sync signal included in a received signal and outputting a sync timing signal indicating the timing of the sync signal; a waveform equalizer having a transversal filter for performing waveform equalization of the received signal by updating coefficients of taps of the transversal filter regarding the timing of the sync timing signal as the position of a center tap; and a controller for receiving at least one of the coefficients of the taps and determining whether or not the synchronization detector has made a synchronization error based on the coefficient of the tap.

According to the digital demodulation device of the present invention, the controller determines whether or not the synchronization detector has made a synchronization error based on the tap coefficient of the transversal filter. Therefore, the digital demodulation device, knowing that a synchronization error has occurred, can take measures for detecting the correct synchronization position.

Specifically, the controller may receive the coefficient of the center tap, compare the coefficient of the center tap with a predetermined threshold, and determine that the synchronization detector has made a synchronization error if the coefficient of the center tap is smaller than the predetermined threshold.

Specifically, the controller may receive the coefficients of the center tap and nearby taps, compare values obtained by normalizing the coefficients of the nearby taps with respect to the coefficient of the center tap as a reference value with a predetermined threshold, and determine that the synchronization detector has made a synchronization error if any of the normalized values is greater than the predetermined threshold.

Specifically, the controller may receive the coefficients of the center tap and nearby taps, compare the coefficients of the nearby taps with the coefficient of the center tap, and determine that the synchronization detector has made a synchronization error if any of the coefficients of the nearby taps is greater than the coefficient of the center tap.

Preferably, the controller instructs the synchronization detector to re-detect a sync signal when determining that the synchronization detector has made a synchronization error, and the synchronization detector re-detects a sync signal in response to the instruction from the controller.

According to the invention described above, when determining that the synchronization detector has made a synchronization error, the controller forces the synchronization detector to re-detect a sync signal. By this re-detection, the synchronization detector detects a new sync signal, and thus it is expected that a correct synchronization position may be detected.

Preferably, the digital demodulation device of the present invention further includes an error corrector for correcting a code error of the signal waveform-equalized by the waveform equalizer. The controller compares the degree of occurrence of code errors found by the error corrector with a predetermined threshold, and instructs the synchronization detector to re-detect a sync signal if the degree of occurrence of code errors is greater than the predetermined threshold. The synchronization detector re-detects a sync signal in response to the instruction from the controller.

According to the invention described above, when determining that the synchronization detector has made a synchronization error, the controller can force the synchronization detector to re-detect a sync signal only in the case that the degree of occurrence of code errors found by the error corrector is greater than a predetermined threshold. Therefore, no re-detection of a sync signal will be performed when the degree of occurrence of code errors found by the error corrector is equal to or smaller than the predetermined threshold even if the synchronization detector has made a synchronization error. Thus, intermittence of a TV output image due to re-detection of a sync signal is prevented.

Preferably, the controller receives the coefficients of the center tap and nearby taps, and, in instructing the synchronization detector to re-detect a sync signal, the controller estimates a displacement between the center tap and a maximum tap among the nearby taps of which the coefficient is the maximum, generates a signal indicating a new synchronization position based on the estimated displacement, and sends the signal to the synchronization detector. The synchronization detector re-detects a sync signal based on the signal from the controller so that the sync signal is detected at the new synchronization position.

According to the invention described above, the controller can estimate the displacement between the center tap and the maximum tap and send a signal indicating a new synchronization position generated based on the displacement to the synchronization detector. The position of the maximum tap may be considered as the position of the correct sync signal in the received signal. In re-detection of a sync signal, the synchronization detector can detect a sync signal at the new synchronization position. In this way, the digital demodulation device can detect the correct synchronization position.

The synchronization detector preferably continues outputting the sync timing signal for at least a predetermined time period from start of the re-detection of a sync signal.

According to the invention described above, the synchronization detector can continue outputting the sync timing signal for at least a predetermine time period from start of the re-detection of a sync signal. It is therefore possible to prevent the problem that no sync timing signal is output from the synchronization detector during re-detection of a sync signal and thus a TV output image is intermitted.

Alternatively, the digital demodulation device of the prevent invention is a digital demodulation device for detecting a sync signal included in a received signal and waveform-equalizing the received signal according to the timing of the detected sync signal, the device including: first and second synchronization detectors each for detecting the sync signal and outputting a sync timing signal indicating the timing of the detected sync signal; and a controller for selecting the sync timing signal output from one of the first and second synchronization detectors as a signal indicating the timing for the waveform equalization, and if determining that the selected signal includes a synchronization error, instructing the other of the first and second synchronization detectors to re-detect a sync signal. The first and second synchronization detectors re-detect a sync signal in response to the instruction from the controller. The controller newly selects a sync timing signal output from one of the first and second synchronization detectors instructed to re-detect a sync signal as the signal indicating the timing for the waveform equalization when a sync timing signal is different in timing from the previously selected sync timing signal.

According to the digital demodulation device of the invention described above, two synchronization detectors (first and second synchronization detectors) are provided. Therefore, while one of the synchronization detectors outputs the sync timing signal, the other synchronization detector can re-detect a sync signal. Thus, since it is possible to continue outputting the sync timing signal to a subsequent circuit during the re-detection of a sync signal, intermittence of a TV output image due to the re-detection of a sync signal is prevented. In addition, when the sync timing signal output as a result of the re-detection of a sync signal by the other synchronization detector is different in timing from the signal selected as the signal indicating the timing for the waveform equalization of the received signal, the sync timing signal is newly selected. This prevents an occurrence of selecting a signal having the same synchronization error as a result of the re-detection of a sync signal, and thus the correct synchronization position can be detected.

Alternatively, the digital demodulation device of the present invention is a digital demodulation device for detecting a sync signal included in a received signal and waveform-equalizing the received signal according to the timing of the detected sync signal, the device including: a first synchronization detector for detecting the sync signal and generating a sync timing signal indicating the timing for the waveform equalization; a second synchronization detector for detecting the sync signal; and a controller for generating a signal indicating a new synchronization position if determining that the sync timing signal includes a synchronization error. The second synchronization detector re-detects a sync signal based on the signal from the controller so that the sync signal is detected at the new synchronization position, generates a signal indicating success or not of the re-detection, and sends the signal to the first synchronization detector. The first synchronization detector re-detects a sync signal based on the signal from the controller so that the sync signal is detected at the new synchronization position when the signal from the second synchronization detector indicates success of the re-detection of a sync signal.

According to the digital demodulation device of the invention described above, if determining that the sync timing signal output from the first synchronization detector has a synchronization error, the controller generates a signal indicating a new synchronization position. However, the first synchronization detector does not perform re-detection of a sync signal based on the new synchronization position until the new synchronization position is found correct. Whether or not the new synchronization position is correct is determined by success or not of re-detection of a sync signal by the second synchronization detector. In other words, the first synchronization detector performs re-detection of a sync signal based on the new synchronization position supplied from the controller, with assurance that the new synchronization position is correct, only when the second synchronization detector has succeeded in re-detection of a sync signal, to thereby detect the correct synchronization position. In addition, during the re-detection of a sync signal by the second synchronization detector, the first synchronization detector continues outputting the sync timing signal to a subsequent circuit. This prevents intermittence of a TV output image due to the re-detection of a sync signal.

According to another aspect of the invention, a synchronization detecting method is provided. The method includes the steps of: detecting a sync signal included in a received signal and generating a sync timing signal indicating the timing of the sync signal; reading at least one of coefficients of taps of a transversal filter used, coefficients of the taps being updated using the timing of the sync timing signal as the position of a center tap to thereby waveform-equalize the received signal; and determining whether or not a synchronization error has occurred in the step of detecting a sync signal based on the coefficient of the tap read in the step of reading.

According to the synchronization detecting method described above, whether or not a synchronization error has occurred in the step of detecting a sync signal is determined in the step of determining. Therefore, knowing that a synchronization error has occurred, measures for detecting a correct synchronization position can be taken.

Specifically, the step of reading may include reading the coefficient of the center tap. The step of determining may include comparing the coefficient of the center tap with a predetermined threshold and determining that a synchronization error has occurred in the step of detecting a sync signal if the coefficient of the center tap is smaller than the predetermined threshold.

Specifically, the step of reading may include reading the coefficients of the center tap and nearby taps. The step of determining may include comparing values obtained by normalizing the coefficients of the nearby taps with respect to the coefficient of the center tap as a reference value with a predetermined threshold, and determining that a synchronization error has occurred in the step of detecting a sync signal if any of the normalized values is greater than the predetermined threshold.

Specifically, the step of reading may include reading the coefficients of the center tap and nearby taps. The step of determining may include comparing the coefficients of the nearby taps with the coefficient of the center tap, and determining that a synchronization error has occurred in the step of detecting a sync signal if any of the coefficients of the nearby taps is greater than the coefficient of the center tap.

Preferably, the synchronization detecting method of the invention further includes the step of correcting a synchronization position by re-detecting a sync signal if it is determined, in the step of determining, that a synchronization error has occurred in the step of detecting a sync signal.

According to the invention described above, when it is determined that a synchronization error has occurred in the step of detecting a sync signal, re-detection of a sync signal is performed. By this re-detection, a new sync signal is detected, and thus it is expected that a correct synchronization position may be detected.

Preferably, the synchronization detecting method of the invention further includes the steps of: counting the number of code errors during correction of code errors of the waveform-equalized signal; and correcting a synchronization position by comparing the number of code errors with a predetermined threshold if it is determined, in the step of determining, that a synchronization error has occurred in the step of detecting a sync signal, and re-detecting a sync signal when the number of code errors is greater than the predetermined threshold.

According to the invention described above, when it is determined that a synchronization error has occurred in the step of detecting a sync signal, the re-detection of a sync signal can be performed only when the number of code errors is greater than a predetermined threshold. Therefore, no re-detection of a sync signal will be performed when the number of code errors is equal to or smaller than the predetermined threshold even if a synchronization error has occurred in the step of detecting a sync signal. This prevents intermittence of a TV output image due to re-detection of a sync signal.

Preferably, the step of reading includes reading the coefficients of the center tap and nearby taps, and the method further includes the step of determining a synchronization error position by estimating a displacement between the center tap and a maximum tap having the maximum coefficient among the nearby taps. The step of correcting a synchronization position preferably includes re-detecting a sync signal so that the sync signal is detected at a new synchronization position indicated by the displacement.

According to the invention described above, the displacement between the center tap and the maximum tap considered as the position of a correct sync signal in the received signal is estimated in the step of determining a synchronization error position. A sync signal is detected at the new synchronization position indicated by the displacement, as redetection of a sync signal. In this way, the correct synchronization position can be detected.

BRIEF DESCRIPTION OF THE DRAWINGS

FIGS. 9A to 9C are views demonstrating calculation of tap coefficients performed when a synchronization error has occurred.

DESCRIPTION OF THE PREFERRED EMBODIMENTS

Hereinafter, preferred embodiments of the present invention will be described with reference to the accompanying drawings.

Embodiment 1

Figure 1:
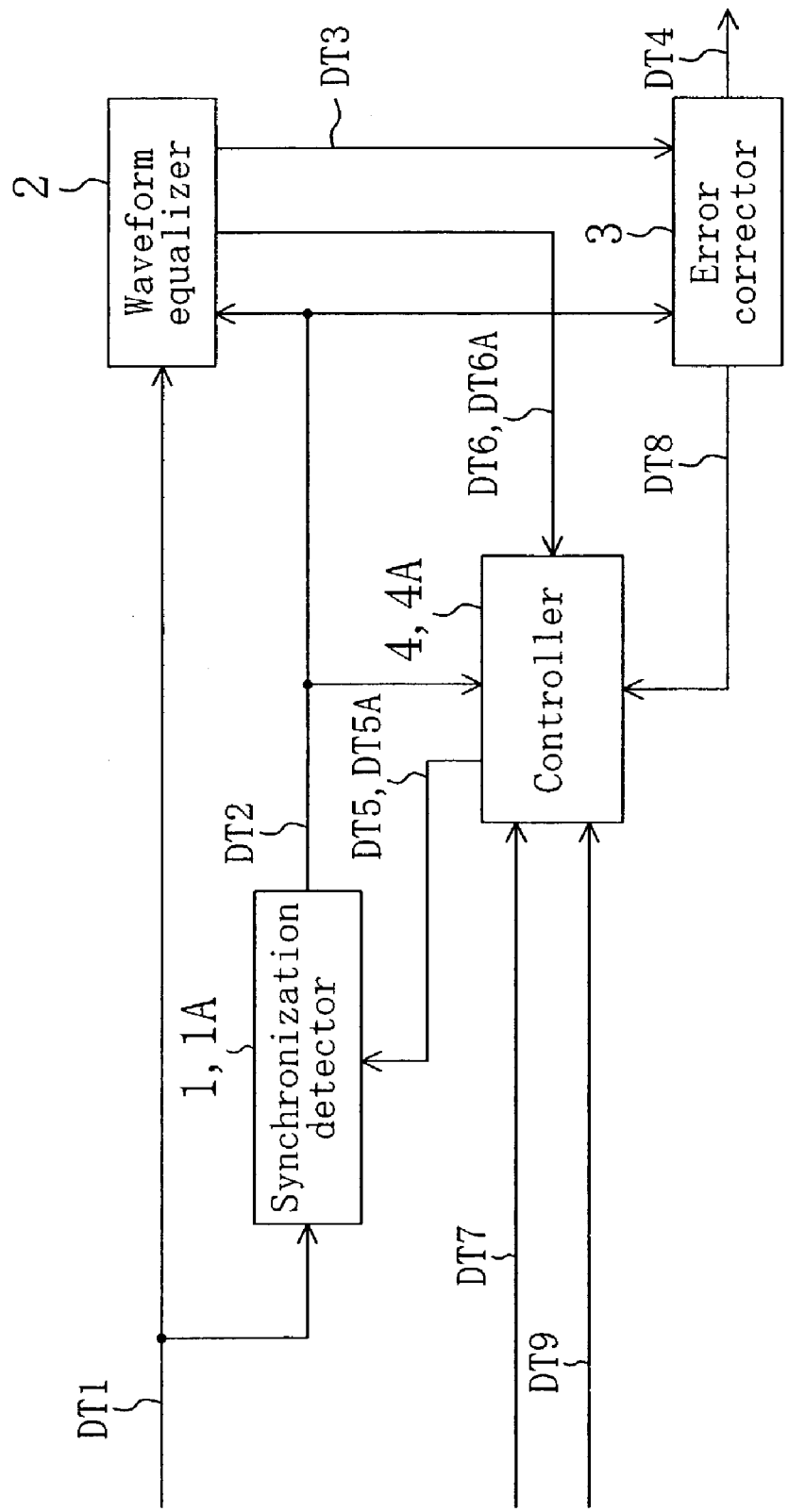
FIG. 1 is a block diagram of a digital demodulation device of Embodiments 1 and 2 of the present invention.

FIG. 1 shows a configuration of a digital demodulation device of Embodiment 1 of the present invention. The digital demodulation device of this embodiment includes a synchronization detector 1, a waveform equalizer 2, an error corrector 3 and a controller 4.

The synchronization detector 1 receives a signal DT1, detects a sync signal included in the received signal DT1, and outputs a sync timing signal DT2 indicating the timing of the detected sync signal. For the detection of synchronization by the synchronization detector 1, a method used in an 8-level vestigial side band (VSB) modulation scheme adopted in U.S., for example, may be employed.

Hereinafter, synchronization detection in the 8-VSB modulation scheme will be described with reference to relevant drawings.

Figure 2:
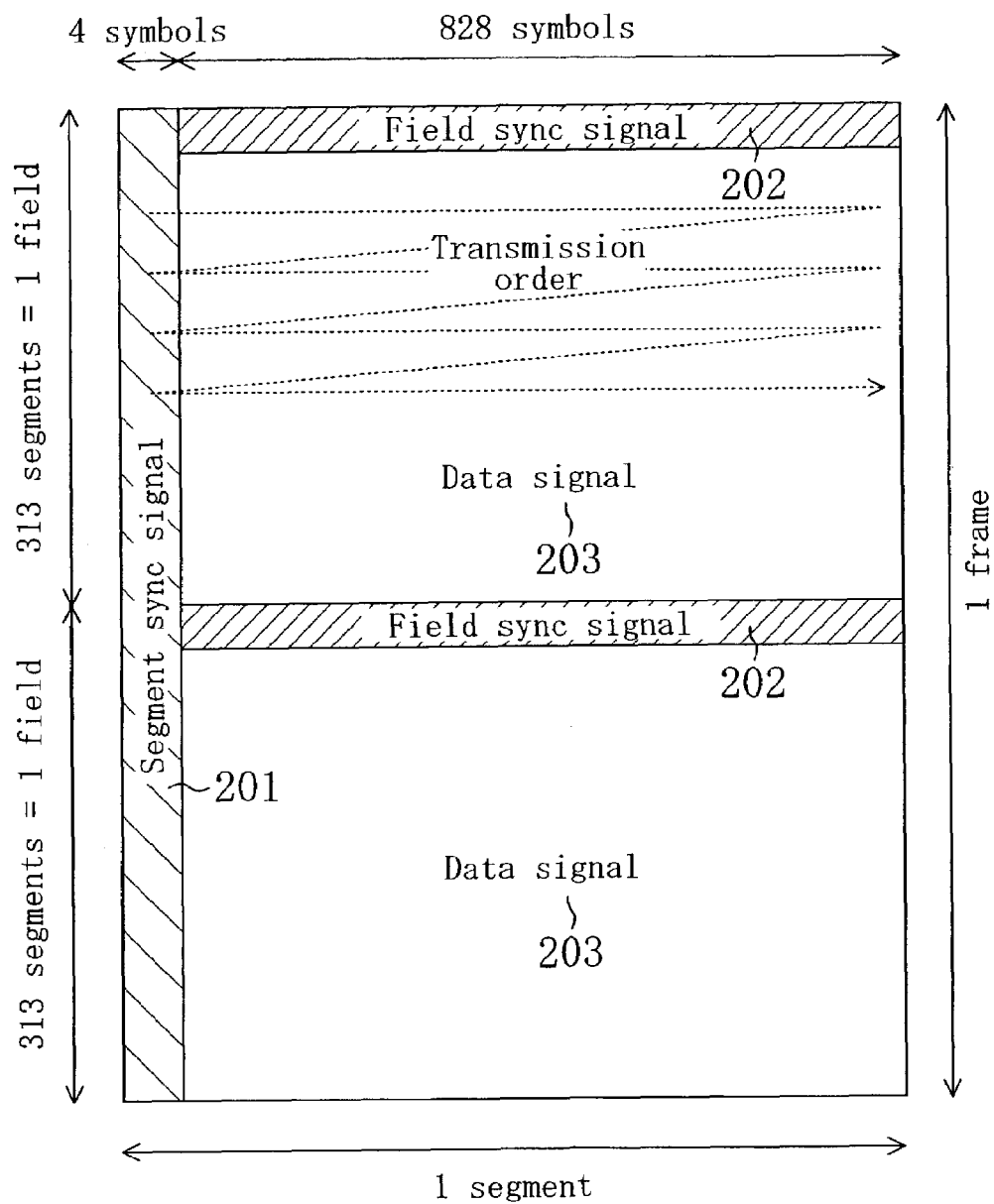
FIG. 2 is a structural view of a frame in an 8-VSB modulation scheme.

FIG. 2 shows a frame format in the 8-VSB modulation scheme. This format is composed of a region including a segment sync signal 201, a region including a field sync signal 202, and a region including a data signal 203. The data signal 203 is obtained by randomizing a digital signal such as video and audio signals with a pseudo-random signal during modulation on the transmitter side.

Figure 3:
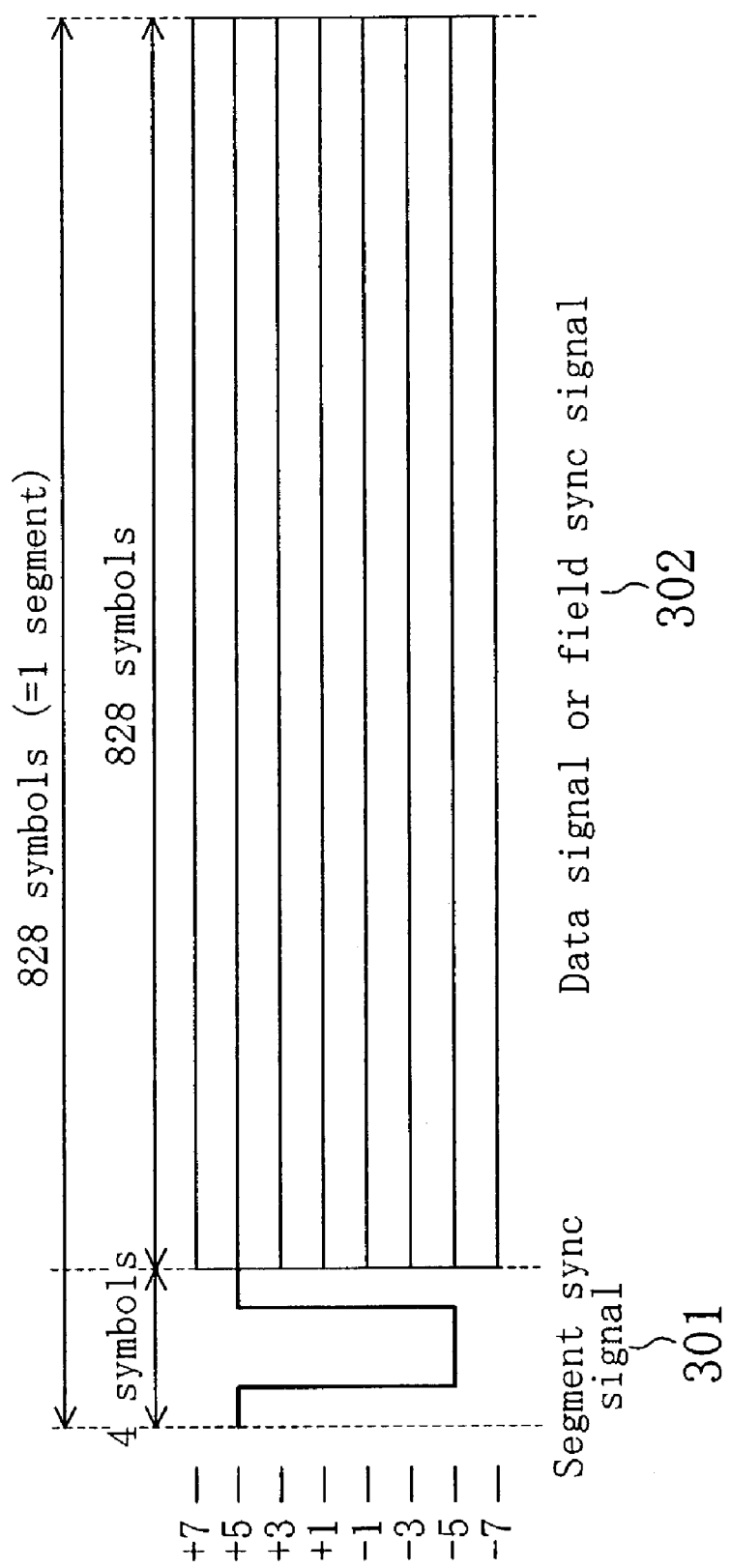
FIG. 3 is a structural view of a segment in the 8-VSB modulation scheme.

FIG. 3 shows a structure of a segment in the 8-VSB modulation scheme. The segment includes 832 symbols and is composed of a region including a segment sync signal 301 and a region including a data signal or a field sync signal 302. The values "+7", "+5", "+3", "+1", "−1", "−3", "−5" and "−7" on the left of FIG. 3 represent eight values the symbols can assume in the 8-VSB modulation scheme.

Figure 4:
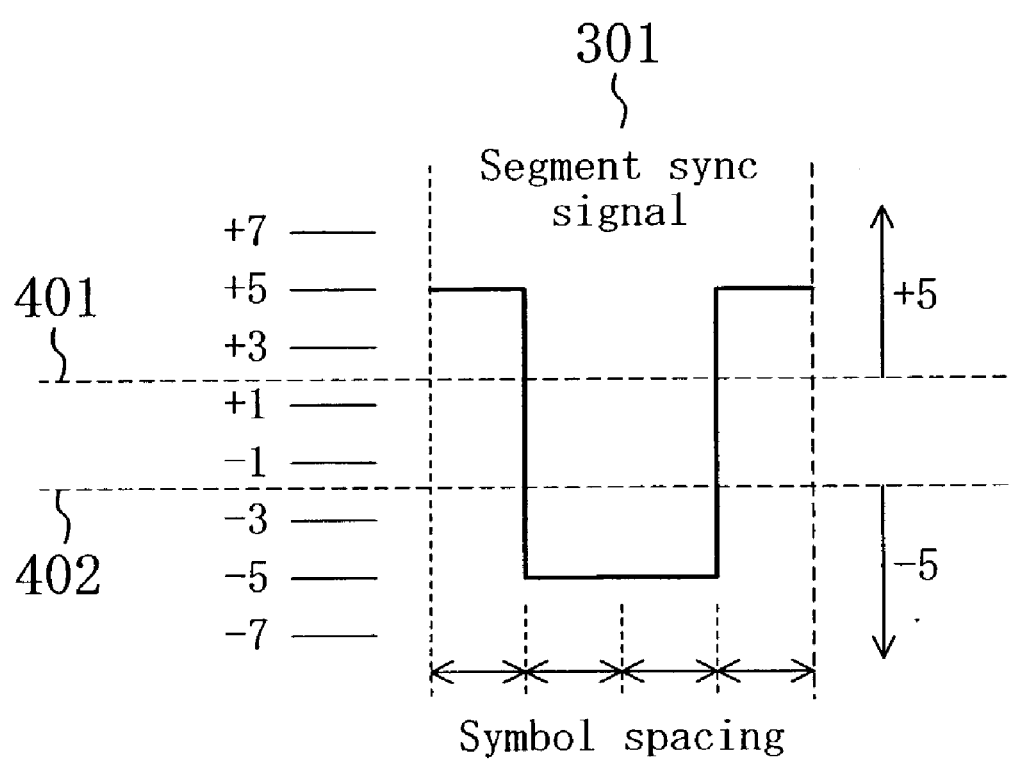
FIG. 4 is a structural view of a segment signal in the 8-VSB modulation scheme.

FIG. 4 shows a symbol structure of the segment sync signal 301, which is composed of continuous four symbols at the head of the segment (symbols mapped with "+5", "−5", "−5" and "+5" in this order from the head).

The value assumed by a symbol may change due to distortion of the received signal DT1. In particular, in multipath interference, distortion of the received signal DT1 is greater as the amplitude of a delayed signal is greater. In view of this, to ensure that the segment sync signal 301 can be correctly recognized even if a symbol value of the signal has changed, first and second thresholds 401 and 402 are provided, and using these thresholds, determination of the segment sync signal is performed. More specifically, a symbol value equal to or larger than the first threshold 401 is determined as "+5", and a symbol value equal to or smaller than the second threshold 402 is determined as "−5". After a series of this determination, if a symbol pattern composed of "+5", "−5", "−5" and "+5" in this order is recognized in the received signal DT1, the signal composed of this symbol pattern is captured as the segment sync signal 301.

The internal configuration and operation of the synchronization detector 1 will be described in detail with reference to relevant drawings.

Figure 5:
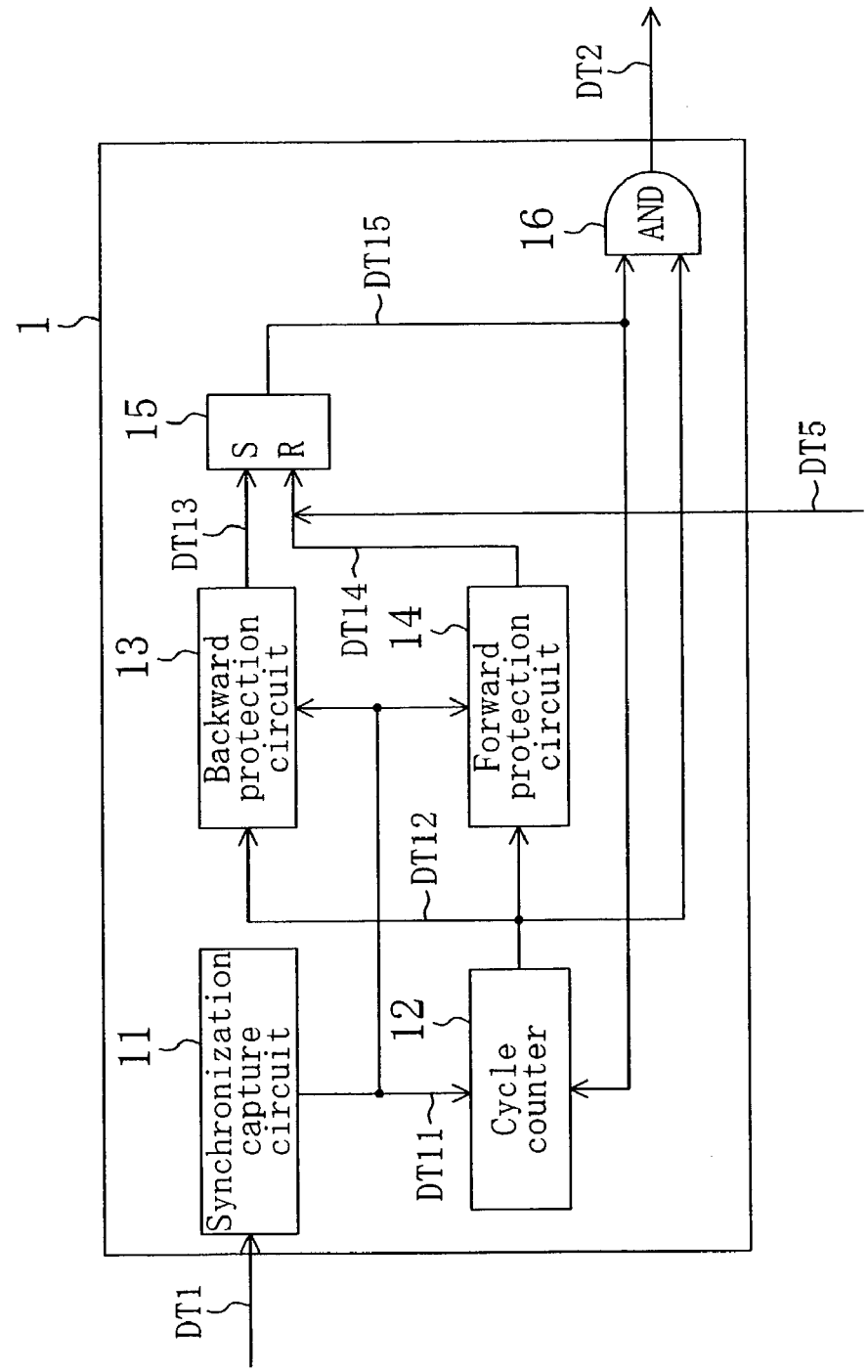
FIG. 5 is a block diagram of a synchronization detector of the digital demodulation device of Embodiment 1 of the present invention.

FIG. 5 shows an internal configuration of the synchronization detector 1, which includes a synchronization capture circuit 11, a cycle counter 12, a backward protection circuit 13, a forward protection circuit 14, a SR flipflop 15 and an AND gate 16.

The synchronization capture circuit 11 captures the segment sync signal (hereinafter, simply called the sync signal) from the received signal DT1, and outputs a sync capture signal DT11 at the timing of the captured sync signal.

The cycle counter 12, receiving the sync capture signal DT11, outputs a cycle timing signal DT12 in a cycle of every segment.

The backward protection circuit 13 counts the number of times of coincidences by which the output timings of the sync capture signal DT11 and the cycle timing signal DT12 are coincident with each other continuously. If the synchronization capture circuit 11 can correctly capture the sync signal, the sync signal in the received signal DT1 should be captured every segment cycle, and thus the output timings of the sync capture signal DT11 and the cycle timing signal DT12 should be coincident with each other continuously. When the number of times of continuous coincidences is equal to or more than a given number of backward protection stages, the backward protection circuit 13 outputs a backward decision signal DT13 deciding that the segment sync signal has been correctly captured.

The SR flipflop 15 is set with input of the backward decision signal DT13, and outputs a synchronization detection signal DT15. The AND gate 16 calculates logical AND of the synchronization detection signal DT15 and the cycle timing signal DT12, and outputs the results as the sync timing signal DT2.

Figure 6:
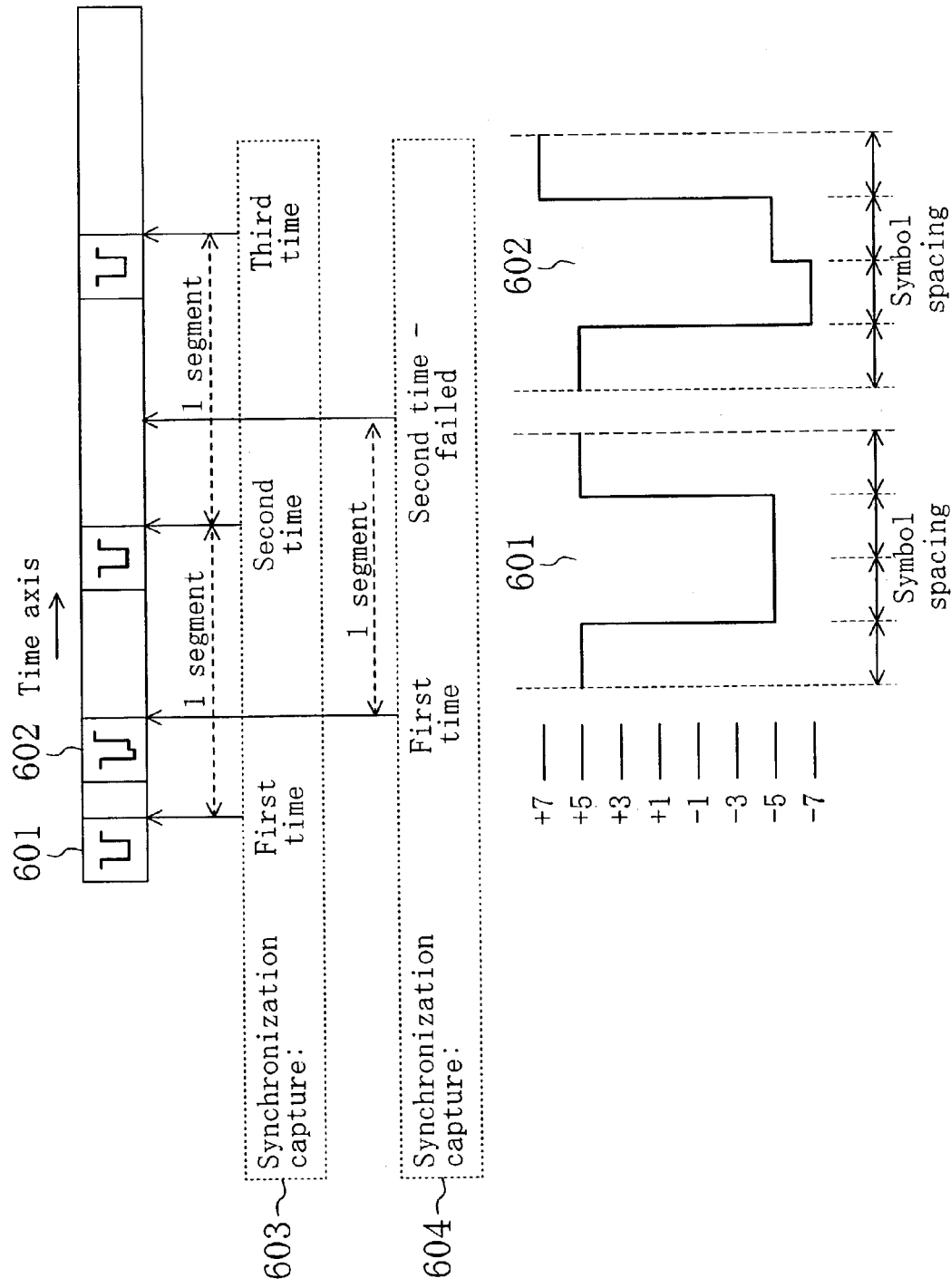
FIG. 6 is a view demonstrating detection of a segment sync signal.

FIG. 6 shows an example of capture of the sync signal included in the received signal DT1. In FIG. 6, a signal 601 is a sync signal of a desired signal, having the same symbol pattern as a sync signal in the 8-VSB modulation scheme. A signal 602 is a sync signal of a delayed signal or a signal resembling the sync signal found in a data signal, which is recognized as the sync signal in the determination using the first and second thresholds described above.

In FIG. 6, a synchronization capture pattern 603 represents a successful example of continuous capture of the sync signal. For example, when the number of backward protection stages is 3, the pattern 603 is determined successful in the synchronization detection, and the sync timing signal DT2 is output.

A synchronization capture pattern 604 represents a failed example of continuous capture of the sync signal. The signal 602, which is not a correct sync signal, does not appear every segment cycle. Therefore, the synchronization capture fails in the second cycle. As a result, no synchronization is detected in the received signal DT1, and thus no sync timing signal DT2 is output.

The forward protection circuit 14 counts the number of times of noncoincidences by which the output timings of the sync capture signal DT11 and the cycle timing signal DT12 are not coincident with each other continuously. If the sync capture circuit 11 has made a synchronization error, the possibility that the sync signal appears every segment cycle is low. Therefore, if the number of times of continuous noncoincidences is equal to or more than a given number of forward protection stages, the forward protection circuit 14 outputs a forward decision signal DT14 deciding that an incorrect sync signal has been captured.

The SR flipflop 15 is reset with input of the forward decision signal DT14 and stops outputting the synchronization detection signal DT15. As a result, the AND gate 16 does not receive the synchronization detection signal DT15, and thus the sync timing signal DT2 is not output.

Figure 20:
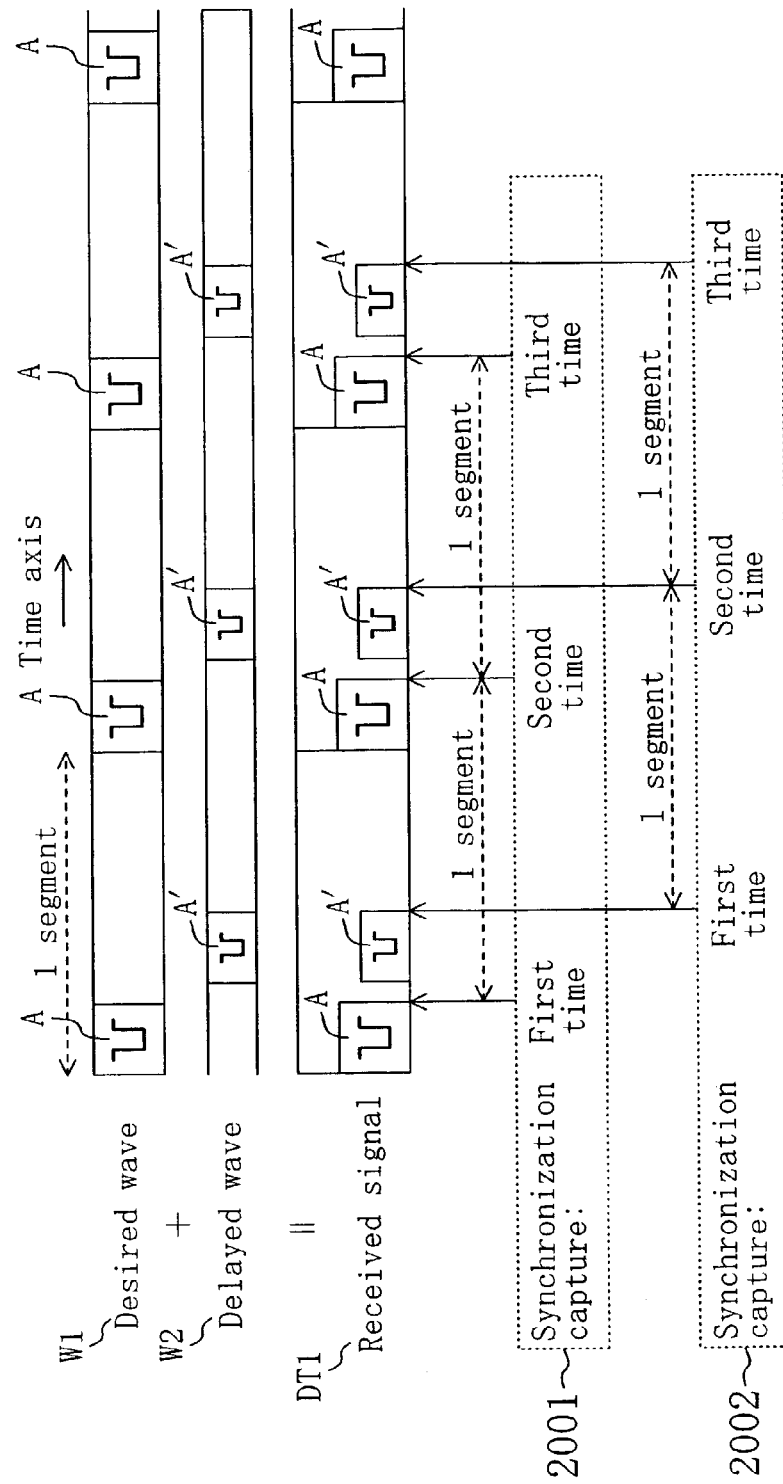
FIG. 20 is a view demonstrating a synchronization error due to multipath interference.
Figure 21:
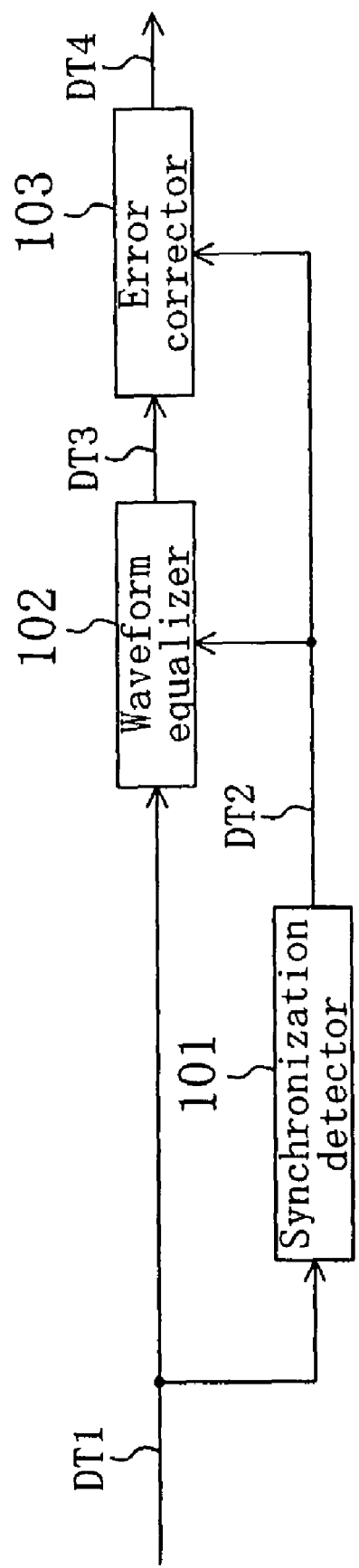
FIG. 21 is a block diagram of a conventional digital demodulation device.

In the manner described above, the synchronization detector 1 captures the sync signal correctly for synchronization detection. However, if the received signal is as shown in FIG. 20, the synchronization detector 101 of the conventional digital demodulation device shown in FIG. 21 has the following problem as described in the prior art. That is, if the synchronization detector 101 first becomes synchronous with a delayed signal, it continues detecting synchronization with the DTV signal of the delayed signal. Therefore, there is no way to know whether or not a synchronization error has occurred.

To solve the above problem, the synchronization detector 1 receives a control signal DT5 from the controller 4 as a reset input to the SR flipflop 15, to ensure that the sync signal of the desired signal included in the received signal DT1 is detected.

The internal configuration and operation of the waveform equalizer 2 will be described in detail with reference to relevant drawings.

Figure 7:
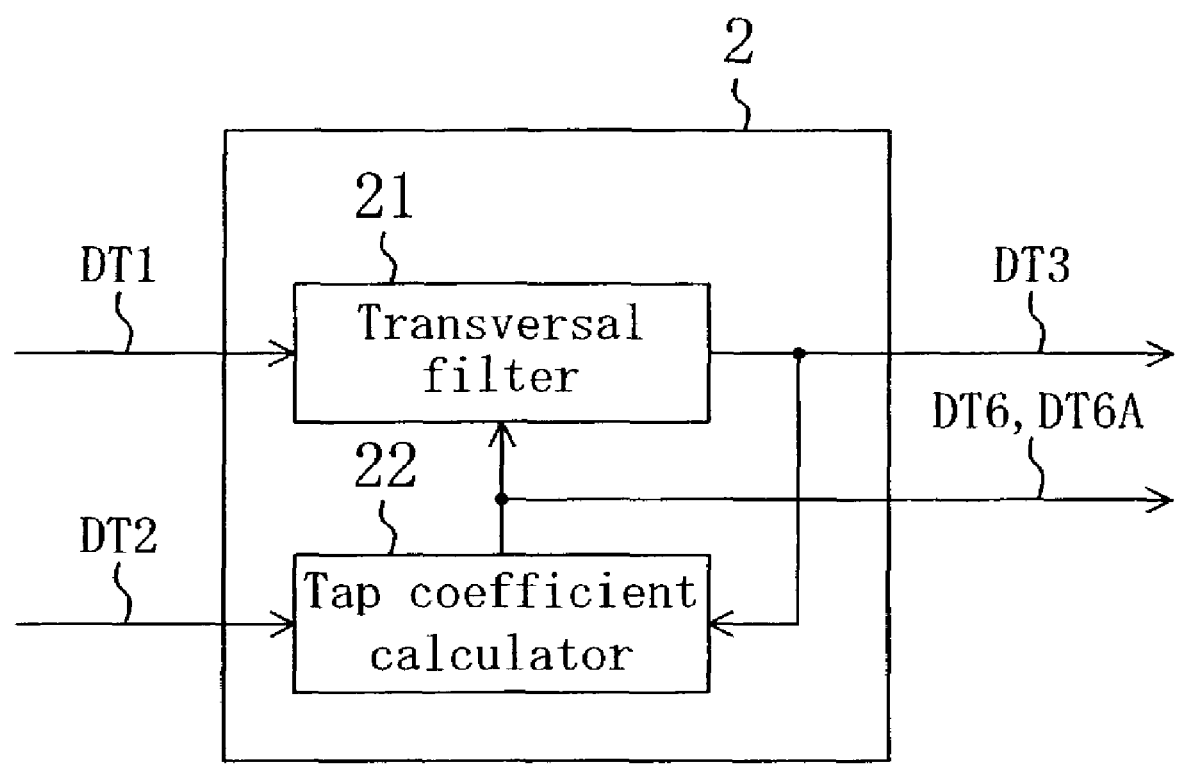
FIG. 7 is a block diagram of a waveform equalizer.

FIG. 7 is an internal configuration of the waveform equalizer 2, which includes a transversal filter 21 and a tap coefficient calculator 22. The waveform equalizer 2 considers the timing of the sync timing signal DT2 as the delay-zero reference position (position of the center tap) and updates tap coefficients of the transversal filter 21 with respect to the reference position, to thereby equalize the waveform of the received signal DT1.

The transversal filter 21 calculates the sum of products between the tap coefficients and the received signal DT1, and outputs a waveform-equalized signal DT3. The tap coefficients are calculated by the tap coefficient calculator 22.

When the synchronization detector 1 correctly detects the synchronization, the sync signal having the symbol pattern of "+5", "−5", "−5" and "+5" should appear in the received signal DT1 at the timing of the sync timing signal DT2 input into the tap coefficient calculator 22. Therefore, the tap coefficient calculator 22 calculates tap coefficients so that the symbol pattern of the received signal DT1 at the delay-zero reference position is close to "+5", "−5", "−5" and "+5". By use of the thus-calculated tap coefficients, distortion of the received signal DT1 can be reduced. That is, the received signal DT1 can be waveform-equalized.

The calculation of tap coefficients is as follows.

Figure 8:
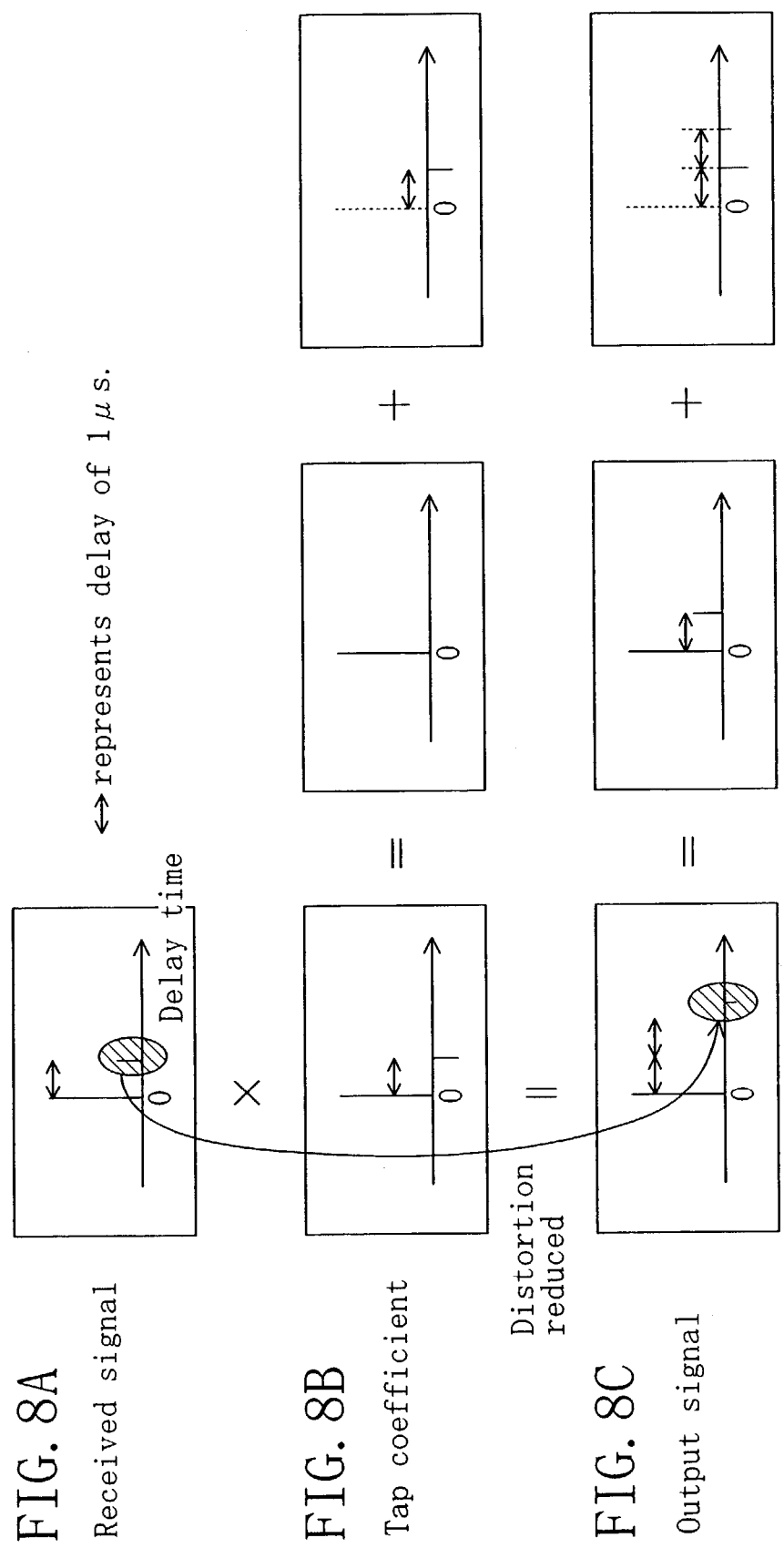
FIGS. 8A to 8C are views demonstrating calculation of tap coefficients performed when synchronization detection is correct.

FIGS. 8A to 8C show an example of calculation of tap coefficients executed when the synchronization detector 1 correctly detects the synchronization. FIG. 8A refers to the received signal DT1 input into the transversal filter 21, FIG. 8B refers to tap coefficients, and FIG. 8C refers to the signal DT3 output from the transversal filter 21.

The received signal DT1 is a composite of a desired signal at delay zero and a delayed signal having an amplitude one-third as large as the desired signal at delay 1 μs (FIG. 8A). With this received signal DT1, the tap coefficient calculator 22 sets the coefficient of the center tap at one and the coefficient of the tap at delay 1 μs at −⅓ (FIG. 8B). As a result, as the output signal DT3, obtained is a composite signal of the desired signal at delay zero and a delayed signal −⅑ times as large as the desired signal at delay 2 μs (FIG. 8C). That is, by the waveform equalization, the distortion at delay 1 μs of the received signal DT1 is reduced.

FIGS. 9A to 9C show an example of calculation of the tap coefficient executed when the synchronization detector 1 has made a synchronization error. FIG. 9A refers to the received signal DT1 input into the transversal filter 21, FIG. 9B refers to tap coefficients, and FIG. 9C refers to the signal DT3 output from the transversal filter 21.

The received signal DT1 is a composite of a desired signal at delay −1 μs and a delayed signal having an amplitude one-third as large as the desired signal at delay zero (FIG. 9A). The reason why the desired signal is at delay −1 μs is that the synchronization detector 1 has made a synchronization error, becoming synchronous with a sync signal of the delayed signal delayed 1 μs behind the desired signal. With this received signal DT1, the tap coefficient calculator 22 calculates the tap coefficients so that the sync signal appears at the position of delay zero indicated by the sync timing signal DT2 in the output signal DT3. For example, the tap coefficient calculator 22 sets the tap coefficient at delay 1 μs at one and the tap coefficient at delay 2 μs at −⅓ (FIG. 9B). As a result, as the output signal DT3, obtained is a composite signal of the desired signal at delay zero and a delayed signal −⅑ times as large as the desired signal at delay 2 μs (FIG. 9C).

In the example shown in FIGS. 9A to 9C, the tap coefficients are calculated so that the sync signal of the desired signal appears at the position of delay zero indicated by the sync timing signal DT2 in the output signal DT3. Actually, the tap coefficients are not necessarily converged to such values. Even if successfully converted, another distortion will occur in the output signal DT3 at the stage of calculation of the sum of products by the transversal filter 21. This distortion occurs because the waveform equalizer 2 attempts to remove the desired signal in the received signal DT1 regarding it as noise based on the sync timing signal DT2 generated under a synchronization error. Since the desired signal is greater in energy than a delayed signal, it is difficult to completely remove the desired signal.

The error corrector 3 corrects a code error of the signal DT3 waveform-equalized by the waveform equalizer 2, and outputs the error-corrected signal DT4 to a subsequent circuit. As the error corrector 3, a trellis demodulator may be used, for example.

The controller 4 determines whether or not the synchronization detector 1 has made a synchronization error. If determining that a synchronization error has occurred, the controller 4 outputs the control signal DT5 for instructing the synchronization detector 1 to re-detect the sync signal.

For this determination, the controller 4 receives a center tap coefficient DT6 from the waveform equalizer 2 and compares the center tap coefficient DT6 with an externally supplied center tap coefficient threshold DT7. In addition, for decision whether or not to output the control signal DT5, the controller 4 receives an error rate DT8 indicating the degree of occurrence of code errors during the code error correction, and compares the error rate DT8 with an externally supplied error rate threshold DT9. The thresholds DT7 and DT9 may not be supplied externally, but may be set inside the controller 4 in advance.

Figure 10:
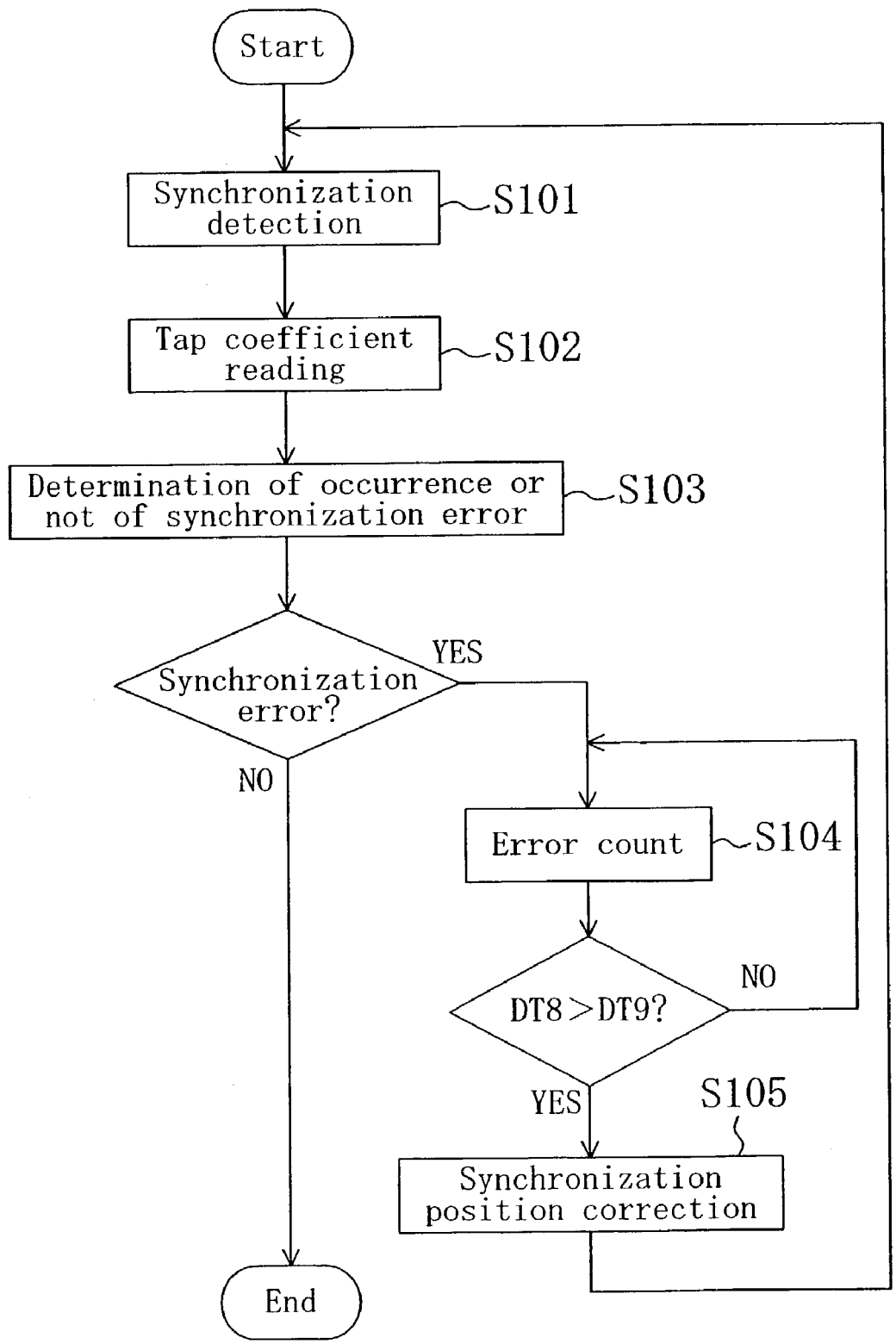
FIG. 10 is a flowchart of the digital demodulation device of Embodiment 1 of the present invention.

The operation of the digital demodulation device of this embodiment having the configuration described above will be described with reference to the flowchart of FIG. 10.

In step S101 (the step of detecting a sync signal), the synchronization detector 1 detects the sync signal included in the received signal DT1. When succeeding in detection of the sync signal, the synchronization detector 1 outputs the sync timing signal DT2.

In step S102 (the step of reading), the controller 4 reads the center tap coefficient DT6 from the waveform equalizer 2. A wait time of about 200 ms is set for the time required from the detection of the sync signal by the synchronization detector 1 until the convergence of the tap coefficient by the waveform equalizer 2.

In step S103 (the step of determining), whether or not the synchronization detector 1 has made a synchronization error is determined. Specifically, the controller 4 compares the center tap coefficient DT6 with the center tap coefficient threshold DT7 and determines that the synchronization detector 1 has made a synchronization error if DT6<DT7 (or DT6≦DT7). If the synchronization detector 1 is determined having made a synchronization error, the process proceeds to step S104. Otherwise, if the synchronization detection is determined correct, the process is terminated.

The center tap coefficient threshold DT7 is preferably set at 0.7. The reason is that the center tap coefficient is often smaller than 0.7 when the synchronization detector 1 has made a synchronization error.

In step S104 (the step of counting the number of code errors), the error corrector 3 counts the number of code errors during the code error correction of the waveform-equalized signal DT3, and outputs the results to the controller 4 as the error rate DT8. The number of errors is counted about 200 ms after the detection of the sync signal by the synchronization detector 1. The reason is that the counting of the number of errors should be started after the waveform equalizer 2 converges the tap coefficient and outputs the waveform-equalized signal DT3.

The controller 4 compares the error rate DT8 with the error rate threshold DT9, and if DT8>DT9 (or DT8≧DT9), the process proceeds to step S105. If DT8≦DT9 (or DT8<DT9), the process returns to step S104, so as to constantly monitor whether or not the error rate DT8 exceeds the error rate threshold DT9 (or is equal to or more than the error rate threshold DT9).

The error rate threshold DT9 is preferably set at $5.0 \times 10^{-2}$. The reason is that in the case that a DTV signal in the 8-VSB modulation scheme undergoes multipath interference, a problem such as block noise generally occurs in a TV output image when the bit error rate is $5.0 \times 10^{-2}$ or more during trellis demodulation. In other words, re-detection of the sync signal is not performed even when the synchronization detector 1 makes a synchronization error causing a code error in the waveform-equalized signal DT3, as long as the error corrector 3 corrects the code error and outputs a normal output image. By this measure, it is possible to prevent intermittence of image output due to re-detection of the sync signal.

In step S105 (the step of correcting a synchronization position), the controller 4 outputs the control signal DT5 to the synchronization detector 1 for instruction of re-detection of the sync signal. This returns the process to step S101, where the synchronization detector 1 re-detects the sync signal. By re-detection of the sync signal, in many cases, the sync signal of the desired signal can be captured and thus the synchronization position can be corrected.

As described above, in this embodiment, whether or not the synchronization detector 1 has made a synchronization error can be determined based on the center tap coefficient obtained by the waveform equalizer 2. In addition, if it is determined that a synchronization error has occurred, the synchronization detector 1 re-detects the sync signal, to enable detection of the correct synchronization position.

Moreover, in the event that the synchronization detector 1 has made a synchronization error but no problem has occurred in a TV output image, the synchronization detector 1 refrains from re-detecting the sync signal unnecessarily, and thus frequent intermittence of a TV output image is avoided.

The wait time of about 200 ms was provided as the time for convergence of the tap coefficient in the waveform equalizer 2. The wait time is not limited to this, but the optimum wait time may vary with the configuration of the waveform equalizer 2. Although the trellis demodulator was used as the error corrector 3, any device capable of performing error correction may be used. For example, a Reed-Solomon demodulator for performing error correction of Reed-Solomon encoded data may be used. The optimum value of the error rate threshold DT9 may vary with the demodulator used as the error corrector 3.

Embodiment 2

A digital demodulation device of Embodiment 2 of the present invention is the same in configuration as that of Embodiment 1 shown in FIG. 1, except that a synchronization detector 1A and a controller 4A in Embodiment 2 are different in configuration from the counterparts in Embodiment 1. In this embodiment, as in Embodiment 1, the received signal DT1 is an 8-VSB modulated signal.

The synchronization detector 1A receives the received signal DT1, detects the sync signal included in the received signal DT1, and outputs the sync timing signal DT2. Also, during re-detection of the sync signal, the synchronization detector 1A has a function of detecting a new sync signal at a new synchronization position indicated by a control signal DT5A.

Figure 11:
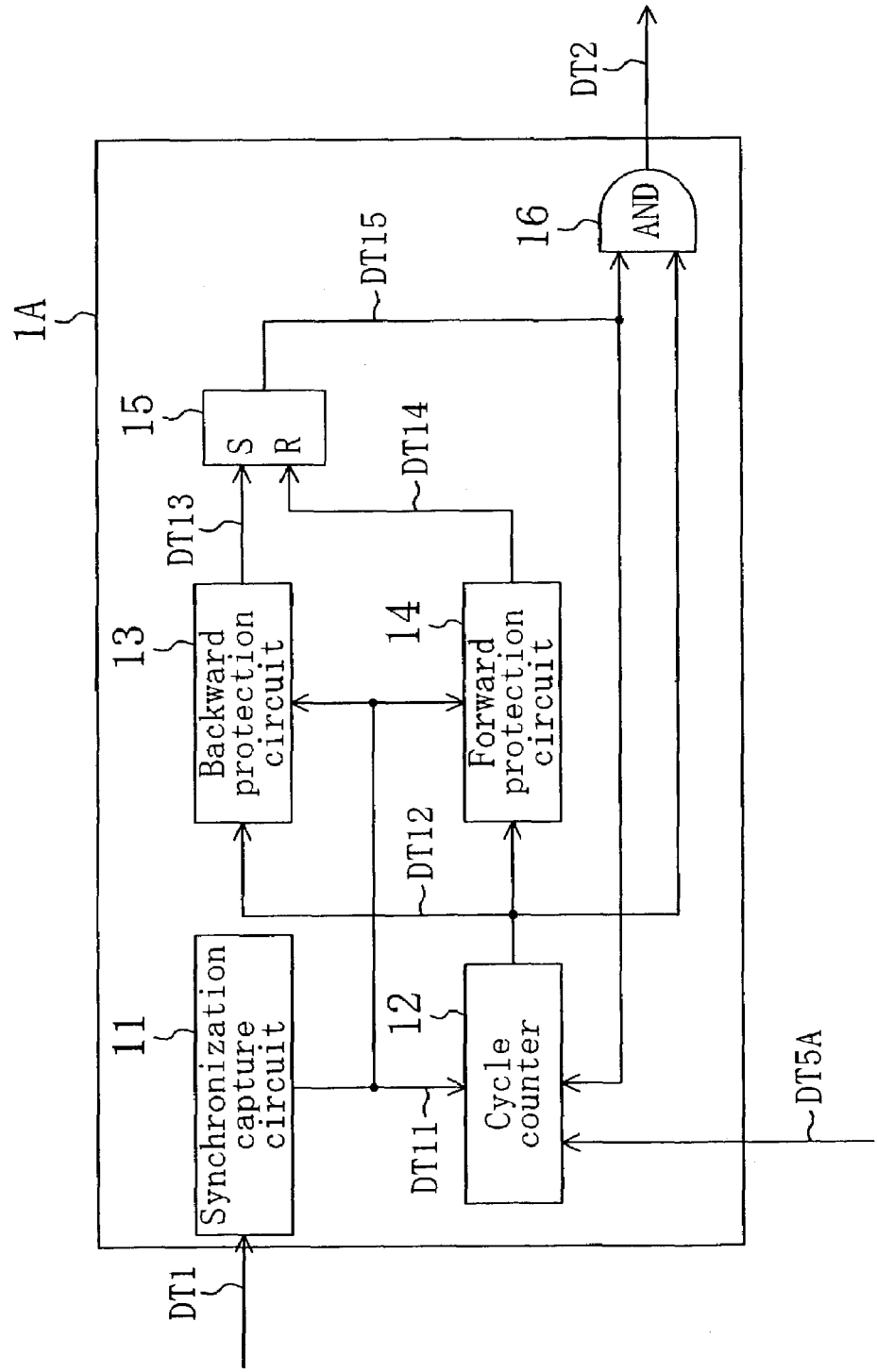
FIG. 11 is a block diagram of a synchronization detector of the digital demodulation device of Embodiment 2 of the present invention.

FIG. 11 shows an internal configuration of the synchronization detector 1A, which is the same as that of the synchronization detector 1 in Embodiment 1 except that the control signal DT5A is input into the cycle counter 12.

When receiving the control signal DT5A, the cycle counter 12 shifts the cycle timing signal DT12 by an amount indicated by the control signal DT5A, and outputs the shifted cycle timing signal DT12. The synchronization capture circuit 11 captures a new sync signal included in the received signal DT1 in synchronization with the output timing of the cycle timing signal DT12. As a result, the synchronization detector 1 outputs the sync timing signal DT2 in synchronization with the new synchronization position indicated by the control signal DT5A.

The controller 4A receives coefficients DT6A of the center tap and nearby taps, such as five adjacent taps including the center tap in the center, from the waveform equalizer 2. Using the coefficients, the controller 4A determines whether or not the synchronization detector 21A has made a synchronization error in the same manner as that described for the controller 4 in Embodiment 1. In addition, if concluding that a synchronization error has occurred, the controller 4A determines the correct synchronization position. The controller 4A estimates a displacement between the delay-zero reference position indicated by the sync timing signal DT2 from the synchronization detector 1A and the position determined as the correct synchronization position. Based on the estimated displacement, the controller 4A generates the control signal 5A indicating the new synchronization position and outputs the signal to the synchronization detector 1A.

The determination of the correct synchronization position and calculation of the displacement from the correct synchronization position by the controller 4A will be described.

As described above with reference to FIGS. 9A to 9C, when the synchronization detector 1A has made a synchronization error, the maximum coefficient value is not the center tap coefficient, but the coefficient of a tap near the center tap. The reason is that in the waveform equalization by the waveform equalizer 2, the tap coefficients are calculated so that the sync signal of the desired signal great in energy appears at the delay-zero position indicated by the sync timing signal DT2. Therefore, when it is determined that the synchronization detector 1A has made a synchronization error, the displacement between the delay-zero position indicated by the sync timing signal DT2 and the correct position, that is, the position of the sync timing of the desired signal is determined equal to a delay amount from the center tap to the tap assuming the maximum value among the nearby tap coefficients (hereinafter, this tap is called the maximum tap).

The delay amount can be calculated by multiplying the displacement between the center tap and the maximum tap by the delay time per tap. For example, in the example shown in FIGS. 9A to 9C, in which the displacement between the center tap and the maximum tap is −1 and the delay time per tap is 1 µs, the delay amount is calculated as −1 µs. That is, it is expected that the sync signal of the desired signal exists at the position delayed by −1 µs from the current synchronization position.

Figure 12:
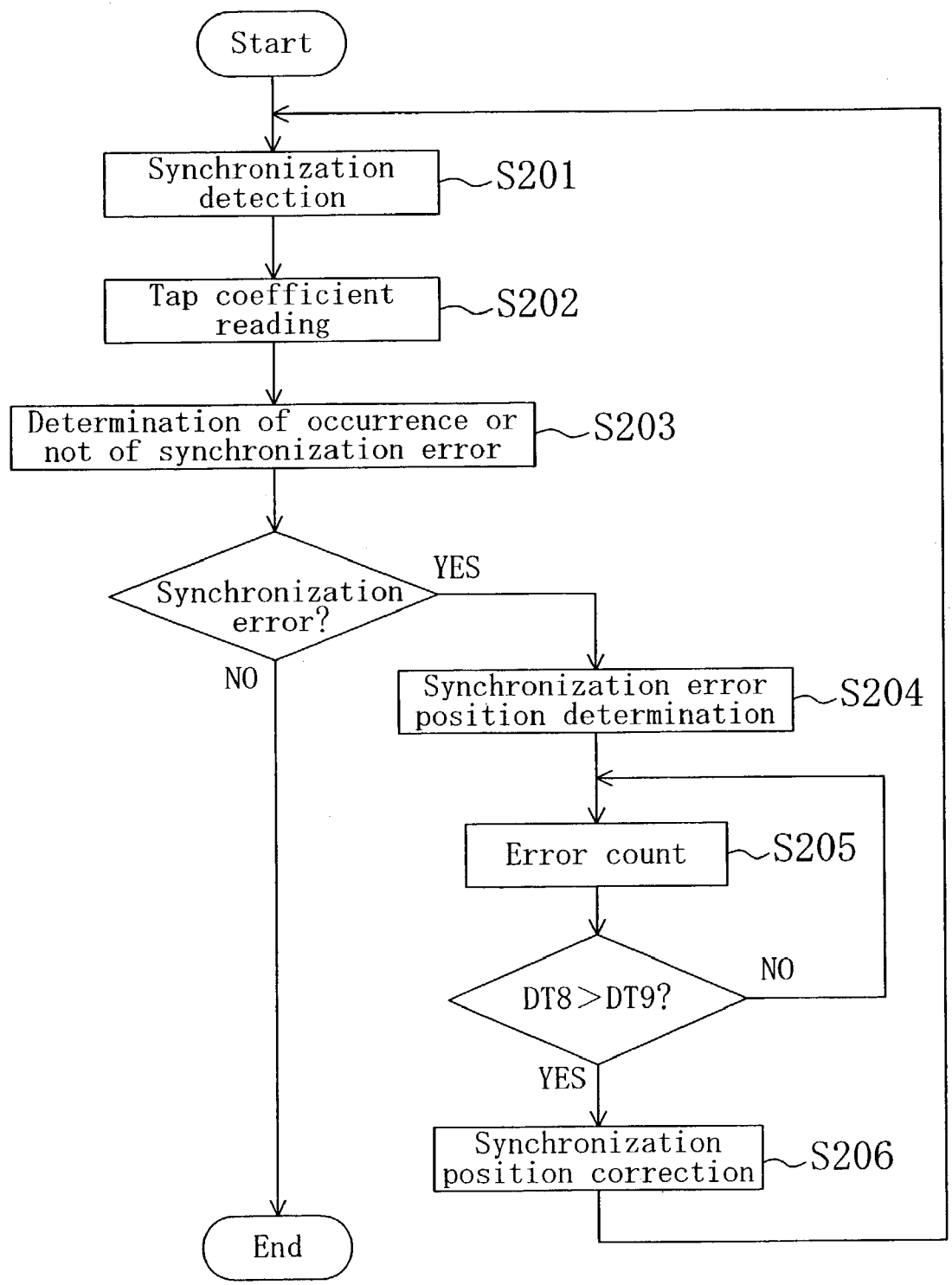
FIG. 12 is a flowchart of the digital demodulation device of Embodiment 2 of the present invention.

The operation of the digital demodulation device of this embodiment having the configuration described above will be described with reference to the flowchart of FIG. 12.

In step S201 (the step of detecting a sync signal), the synchronization detector 1A detects the sync signal included in the received signal DT1. When succeeding in detection of the sync signal, the synchronization detector 1A outputs the sync timing signal DT2.

In step S202 (the step of reading), the controller 4A reads the tap coefficients DT6A of the center tap and nearby taps from the waveform equalizer 2. The wait time until convergence of the tap coefficients by the waveform equalizer 2 is as described in Embodiment 1.

In step S203 (the step of determining), whether or not the synchronization detector 1A has made a synchronization error is determined, as described in Embodiment 1.

In step S204 (the step of determining a synchronization error position), the controller 4A estimates the displacement from the correct synchronization position.

In step S205 (the step of counting the number of code errors), the error corrector 3 counts the number of errors, as described in Embodiment 1.

In step S206 (the step of correcting a synchronization position), the controller 4A outputs the control signal DT5A to the synchronization detector 1A for instruction of re-detection of the sync signal. The process then returns to step S201 for re-detection of the sync signal, so that the synchronization detector 1A can detect a new sync signal at a new synchronization position indicated by the control signal DT5A.

As described above, in this embodiment, when the controller 4A determines that the synchronization detector 1A has made a synchronization error, the synchronization detector 1A is allowed to detect a sync signal at a new synchronization position indicated by the control signal DT5A. Since the new synchronization position is given to the synchronization detector 1A for the re-detection of the sync signal, the time required for the synchronization detection can be shortened.

The delay time was used for calculation of the delay amount indicating the new synchronization position for the control signal DT5A. Alternatively, a quantity representing the displacement of the tap and the like may be used.

Embodiment 3

Figure 13:
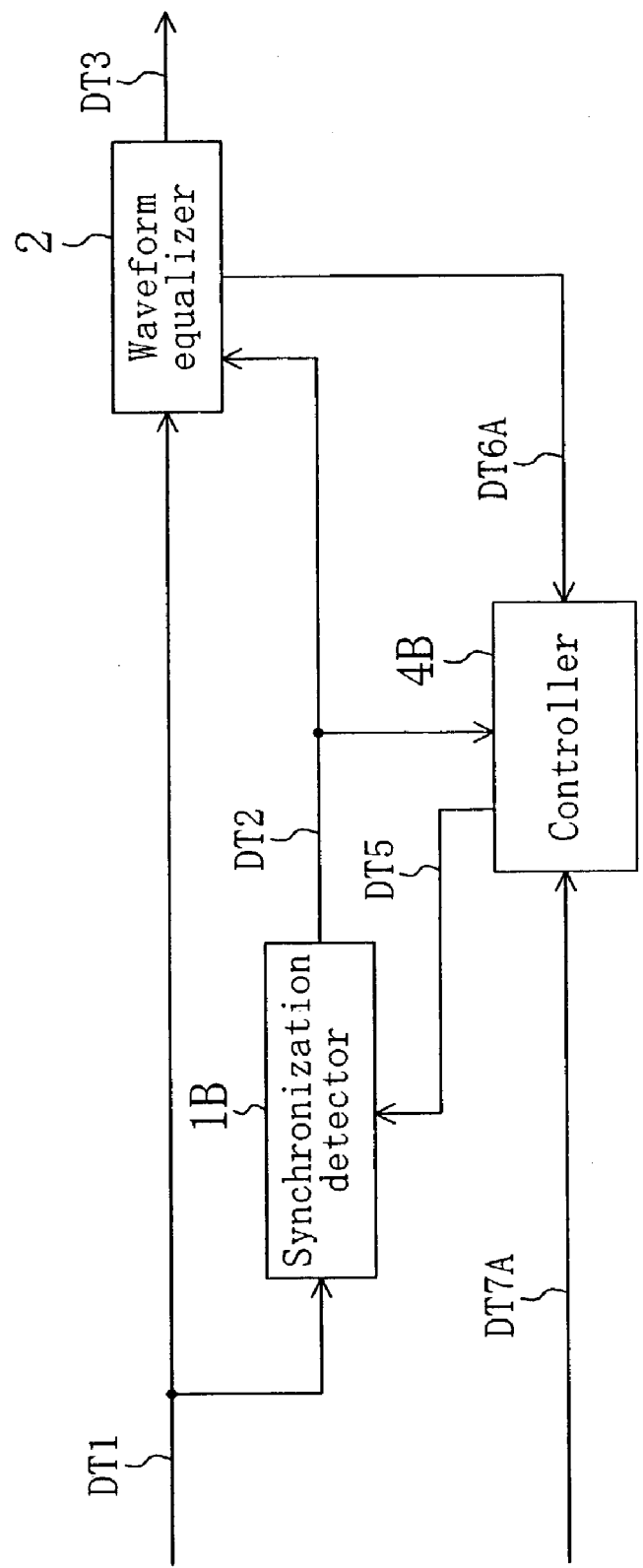
FIG. 13 is a block diagram of a digital demodulation device of Embodiment 3 of the present invention.

FIG. 13 shows a digital demodulation device of Embodiment 3 of the present invention. The digital demodulation device of this embodiment is the same in configuration as those of Embodiments 1 and 2, except that the error corrector 3 is omitted and that a synchronization detector 1B and a controller 4B in this embodiment are different in configuration from the counterparts in Embodiments 1 and 2. In this embodiment, as in Embodiments 1 and 2, the received signal DT1 is an 8-VSB modulated signal.

The synchronization detector 1B re-detects the sync signal in response to the control signal DT5. In this embodiment, during the re-detection of the sync signal, the synchronization detector 1B continues outputting the sync timing signal DT2 having a synchronization error. This enables the waveform equalizer 2 to continue outputting the waveform-equalized signal DT3, and thus intermittence of a TV output image is prevented.

The controller 4B outputs the control signal DT5 when it determines that the synchronization detector 1B has made a synchronization error, without consideration to the degree of occurrence of code errors.

Figure 14:
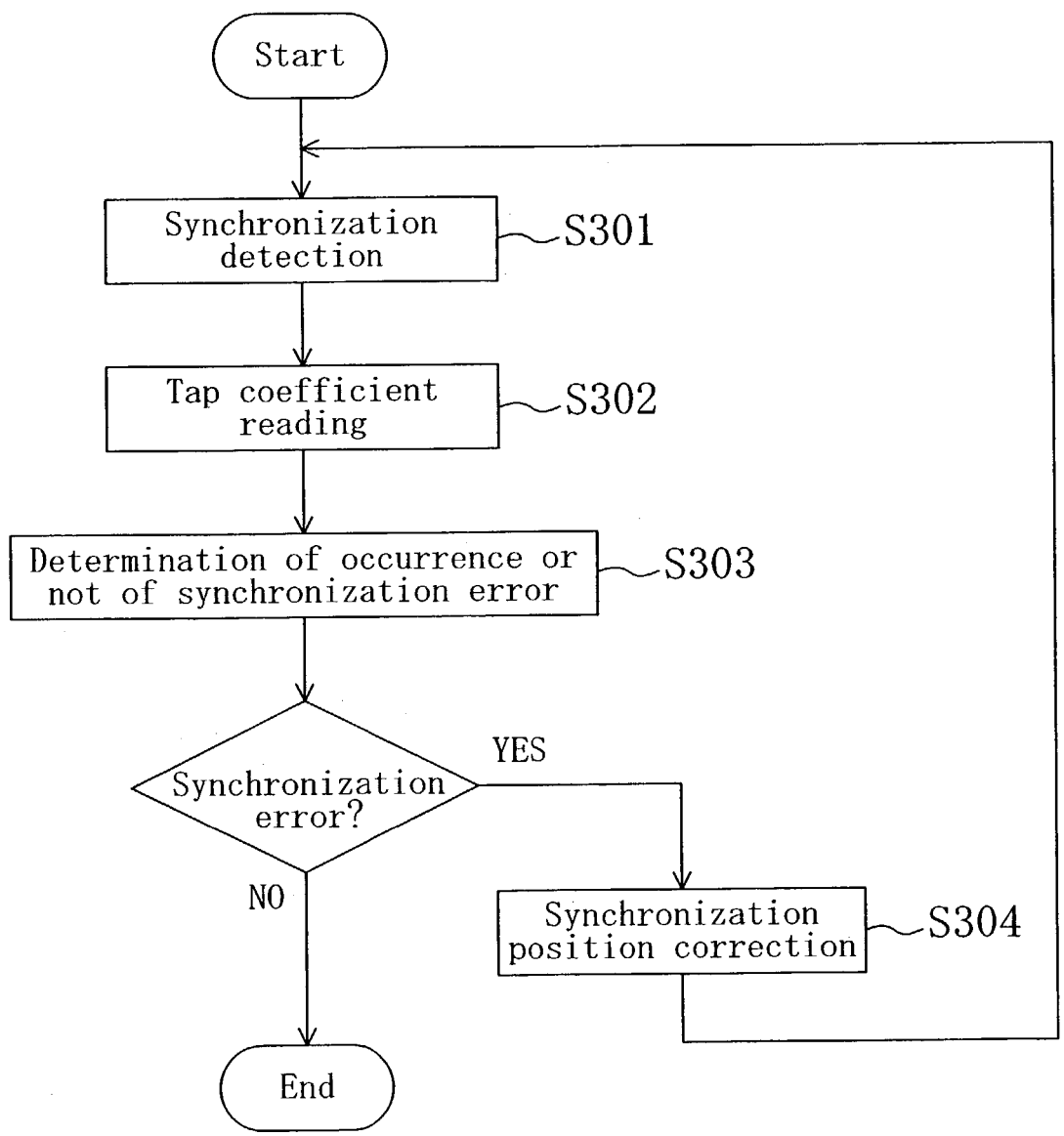
FIG. 14 is a flowchart of the digital demodulation device of Embodiment 3 of the present invention.

The operation of the digital demodulation device of this embodiment having the configuration described above will be described with reference to the flowchart of FIG. 14.

In step S301 (the step of detecting a sync signal), the synchronization detector 1B detects the sync signal included in the received signal DT1. When succeeding in detection of the sync signal, the synchronization detector 1B outputs the sync timing signal DT2.

In step S302 (the step of reading), the controller 4B reads the tap coefficients DT6A of the center tap and nearby taps from the waveform equalizer 2. The wait time until convergence of the tap coefficients by the waveform equalizer 2 is as described in Embodiment 1.

In step S303 (the step of determining), whether or not the synchronization detector 1B has made a synchronization error is determined. Specifically, the controller 4B normalizes the coefficients of taps near the center tap by converting the coefficients to dB values with respect to the center tap coefficient as the reference, and compares the converted values with a tap coefficient conversion threshold DT7A externally supplied. If any of the converted values is greater than the tap coefficient conversion threshold DT7A, the controller 4B determines that the synchronization detector 1B has made a synchronization error. When the synchronization detector 1B is determined having made a synchronization error, the process proceeds to step S304. Otherwise, if the synchronization detection is determined correct, the process is terminated.

The tap coefficient conversion threshold DT7A is preferably set at 0 dB. The reason is that when the synchronization detector 1B have made a synchronization error, the tap coefficient among the coefficients of taps near the center tap corresponding to the position of the sync signal of the desired signal assumes the maximum value, which is equal to or larger than the center tap coefficient. The threshold DT7A may not be supplied externally, but be set inside the controller 4B in advance.

In step S304 (the step of correcting a synchronization position), the controller 4B outputs the control signal DT5 to the synchronization detector 1B for instruction of re-detection of the sync signal. The process then returns to step S301 for re-detection of the sync signal, as described in Embodiment 1.

As described above, in this embodiment, whether or not the synchronization detector 1B has made a synchronization error can be determined from the values obtained by normalizing the coefficients of taps near the center tap with respect to the center tap coefficient. In addition, the synchronization detector 1B continues outputting the sync timing signal DT2 during the re-detection of the sync signal. Therefore, intermittence of a TV output image due to re-detection of the sync signal is prevented.

The dB values were used as the converted values from the coefficients of taps near the center tap. Alternatively, the tap coefficients can be converted to any values as long as the values indicate the correlation between the center tap coefficient and the nearby tap coefficients.

The output of the sync timing signal DT2 was continued until the synchronization detector 1B outputted a new sync timing signal DT2. Alternatively, the time for which the output is continued may be set. For example, the output may be continued for about 10 ms after reception of the control signal DT5.

Embodiment 4

Figure 15:
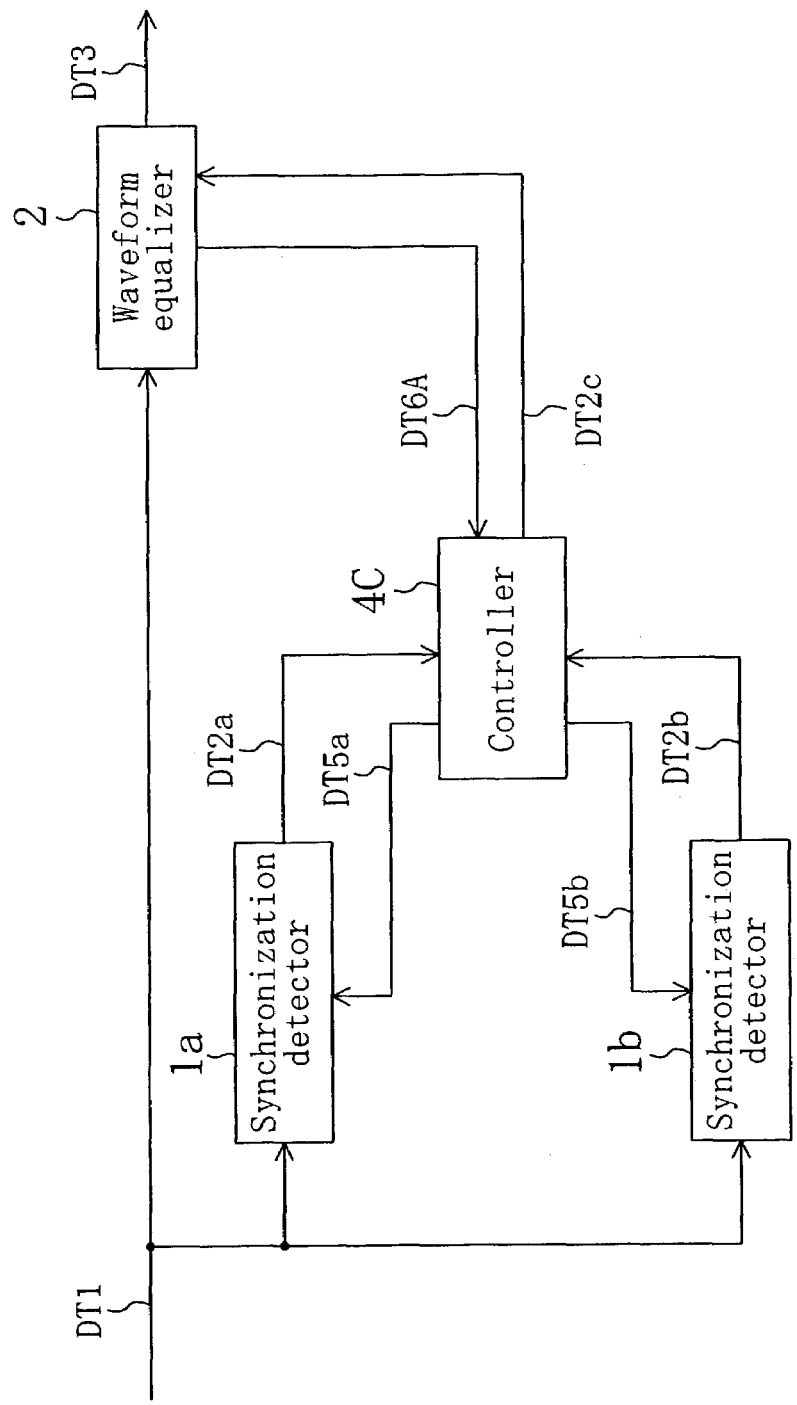
FIG. 15 is a block diagram of a digital demodulation device of Embodiment 4 of the present invention.

FIG. 15 shows a digital demodulation device of Embodiment 4 of the present invention. The digital demodulation device of this embodiment includes first and second synchronization detector 1a and 1b, a waveform equalizer 2, and a controller 4C. The synchronization detectors 1a and 1b and the waveform equalizer 2 are same in configuration and operation as those described in Embodiment 1, and thus the description thereof is omitted here. In this embodiment, as in the previous embodiments, the received signal DT1 is an 8-VSB modulated signal.

The controller 4C selects one of sync timing signals DT2a and DT2b output from the synchronization detectors 1a and 1b, respectively, of which synchronization has been correctly detected, and outputs the selected signal as a sync timing signal DT2c. The controller 4C receives coefficients DT6A of the center tap and nearby taps from the waveform equalizer 2, and determines whether or not the synchronization detector 1a (or 1b) from which the sync timing signal DT2c is output has made a synchronization error.

If determining that the synchronization detector 1a (or 1b) has made a synchronization error, the controller 4C outputs a control signal DT5a (or DT5b) to the synchronization detector 1a (or 1b). At the same time, the controller 4C newly selects the other sync timing signal DT2b (or DT2a) as the sync timing signal DT2c.

To avoid an event that the newly selected sync timing signal DT2b (or DT2a) has the same synchronization error, the controller 4C compares the sync timing signals DT2a and DT2b with each other before the switching of the selection. If the comparison result indicates that the timing is the same between the sync timing signals DT2a and DT2b, the controller 4C outputs the control signal DT5b (or DT5a) for instruction of detection of a different sync signal. The synchronization detector 1a (or 1b) continues outputting the sync timing signal DT2a (or DT2b) having a synchronization error until the synchronization detector 1b (or 1a), considered having made a synchronization error, detects a new sync timing signal. Therefore, the waveform equalizer 2 can continuously output the waveform-equalized signal DT3, and thus intermittence of a TV output image is prevented.

Figure 16:
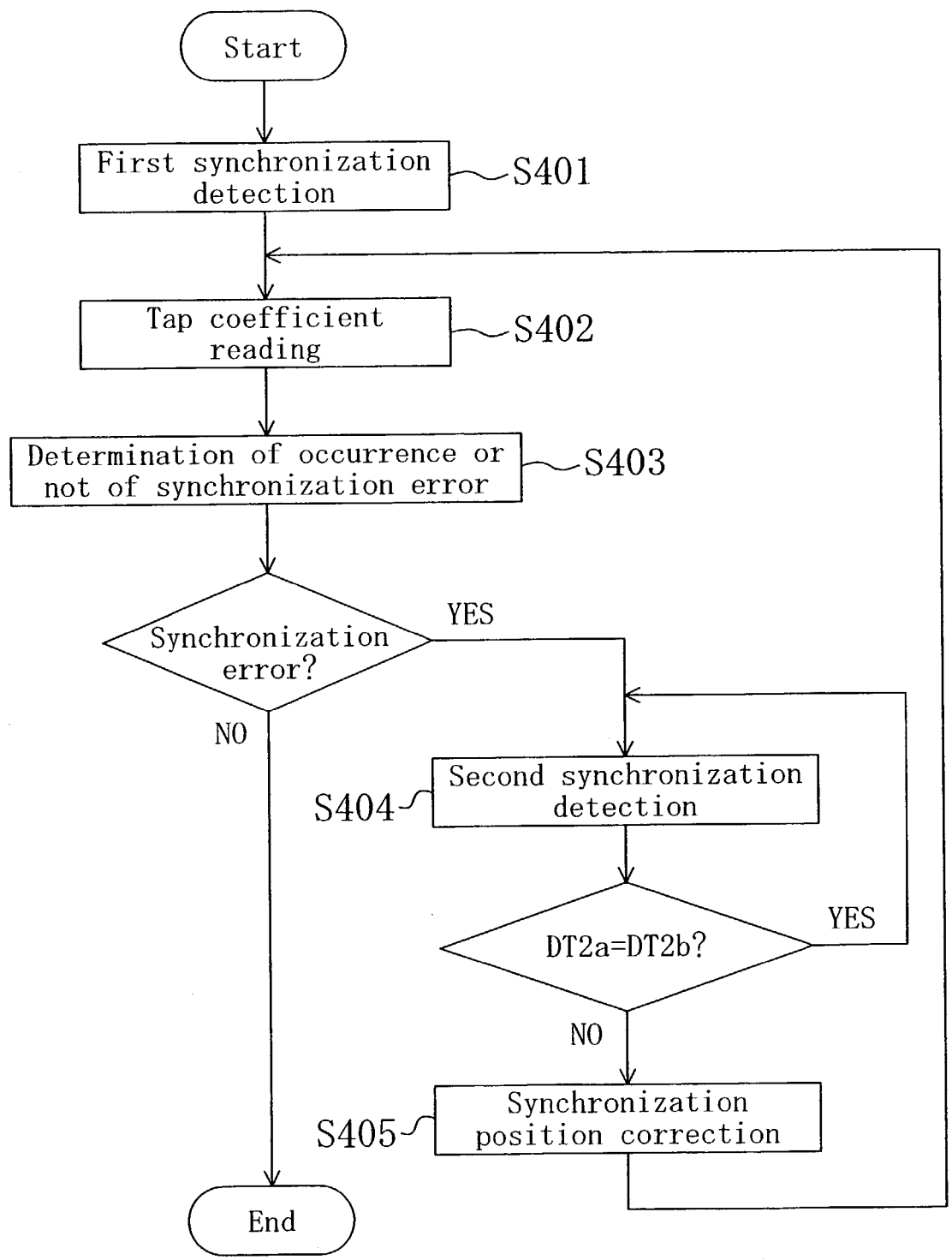
FIG. 16 is a flowchart of the digital demodulation device of Embodiment 4 of the present invention.

The operation of the digital demodulation device of this embodiment having the configuration described above will be described with reference to the flowchart of FIG. 16.

In step S401 (the step of first detecting a sync signal), the synchronization detector 1a (or 1b) detects the sync signal included in the received signal DT1. When succeeding in detection of the sync signal, the synchronization detector 1a (or 1b) outputs the sync timing signal DT2a (or DT2b). The controller 4C selects the sync timing signal DT2a (or DT2b) as the sync timing signal DT2c and outputs the signal to the waveform equalizer 2.

In step S402 (the step of reading), the controller 4C reads the tap coefficients DT6A of the center tap and nearby taps from the waveform equalizer 2. The wait time until convergence of the tap coefficients by the waveform equalizer 2 is as described in Embodiment 1.

In step S403 (the step of determining), whether or not the synchronization detector 1a (or 1b) has made a synchronization error is determined. Specifically, the controller 4C compares the coefficients of the nearby taps with the center tap coefficient, and if any of the nearby tap coefficients is greater than the center tap coefficient, determines that the synchronization detector 1a (or 1b) has made a synchronization error. By the determination that the synchronization detector 1a (or 1b) has made a synchronization error, the controller 4C outputs the control signal DT5b (or DT5a) to the synchronization detector 1b (or 1a) for instruction of re-detection of the sync signal. The process then proceeds to step S404. If the synchronization detection is determined correct, the process is terminated.

In step S404 (the step of second detecting a sync signal), the synchronization detector 1b (or 1a) re-detects a sync signal and outputs the sync timing signal DT2b (or DT2a). The controller 4C compares the sync timing signals DT2a and DT2b with each other. If determining that the timings of the two signals are the same, the controller 4C outputs again the control signal DT5b (or DT5a) for instruction of re-detection of the sync signal, so that step S404 is repeated. If it is determined that the timing of the sync timing signal DT2b (or DT2a) is different from that of the sync timing signal DT2a (or DT2b), the process proceeds to step S405.

In step S405 (the step of correcting a synchronization position), the sync timing signal DT2b (or DT2a) is selected as the sync timing signal DT2c. The process then returns to step S402 for determination whether or not the synchronization detector 1b (or 1a), the source of output of the newly selected sync timing signal DT2b (or DT2a), has made a synchronization error.

As described above, in this embodiment, by examining which is greater, the center tap coefficient or any of the nearby tap coefficients, whether or not the synchronization detector 1a or 1b has made a synchronization error is determined, and the correct synchronization position can be detected.

The use of the two synchronization detectors 1a and 1b is advantageous in the following points. By comparing the two sync timing signals DT2a and DT2b with each other, it is possible to avoid an event of selecting a sync timing signal having the same synchronization error second time. In addition, while one synchronization detector re-detects the sync signal, the other synchronization detector can continue outputting the sync timing signal. This prevents intermittence of an output image.

No priority is given to the two synchronization detectors 1a and 1b. Therefore, the sync timing signal output from the synchronization detector that has succeeded in synchronization detection first at the startup of the digital demodulation device of this embodiment may be selected as the sync timing signal DT2c.

The controller 4C determines whether or not the synchronization detector 1a or 1b has made a synchronization error from the coefficients DT6A of the center tap and nearby taps. Alternatively, the determination may be made in a different manner.

Embodiment 5

Figure 17:
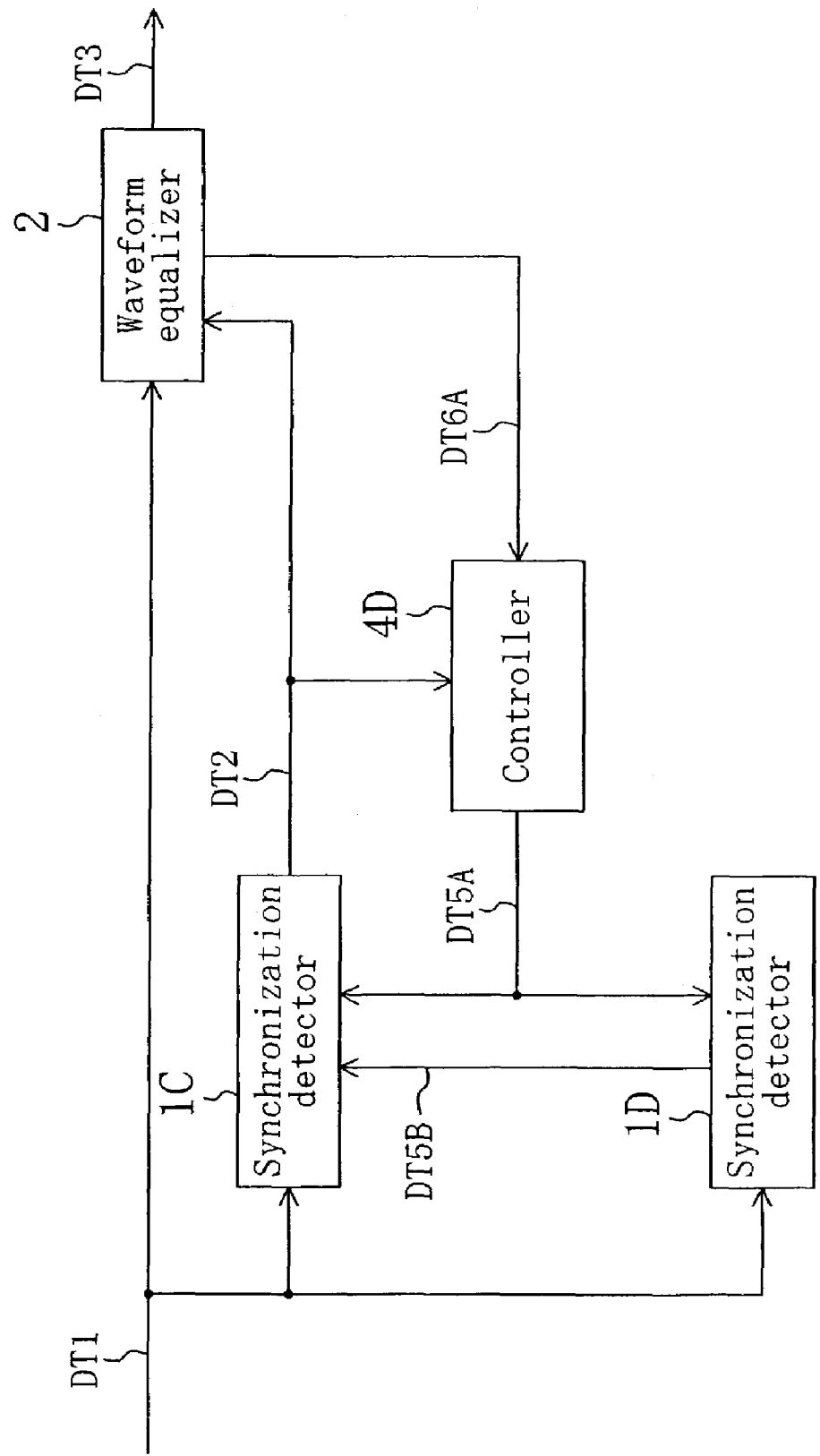
FIG. 17 is a block diagram of a digital demodulation device of Embodiment 5 of the present invention.

FIG. 17 shows a digital demodulation device of Embodiment 5 of the present invention. The digital demodulation device of this embodiment includes first and second synchronization detectors 1C and 1D, a waveform equalizer 2, and a controller 4D. The waveform equalizer 2 is the same in configuration and operation as that in Embodiment 1, and thus the description thereof is omitted here. In this embodiment, as in the previous embodiments, the received signal DT1 is an 8-VSB modulated signal.

The synchronization detector 1C receives the received signal DT1, detects the sync signal included in the received signal DT1, and outputs the sync timing signal DT2. Also, during re-detection of the sync signal, the synchronization detector 1C has a function of detecting a new sync signal at a new synchronization position indicated by the control signal DT5A. In addition, the synchronization detector 1C actually determines whether or not re-detection should be performed according to information indicated by a control signal DT5B.

The synchronization detector 1D receives the received signal DT1 and detects the sync signal included in the received signal DT1. Also, receiving the control signal DT5A, the synchronization detector 1D detects a new sync signal at a new synchronization position indicated by the control signal DT5A, and outputs information indicating success or not of the re-detection of the sync signal as the control signal DT5B.

The controller 4D receives coefficients DT6A of the center tap and nearby taps from the waveform equalizer 2, and determines whether or not the synchronization detector 1C has made a synchronization error. If concluding that a synchronization error has been made, the controller 4D determines the correct synchronization position. The controller 4D estimates the displacement between the delay-zero reference position indicated by the sync timing signal DT2 and the position determined as the correct synchronization position. Based on the estimated displacement, the controller 4D generates the control signal DT5A indicating a new synchronization position and outputs the signal to the synchronization detectors 1C and 1D.

Figure 18:
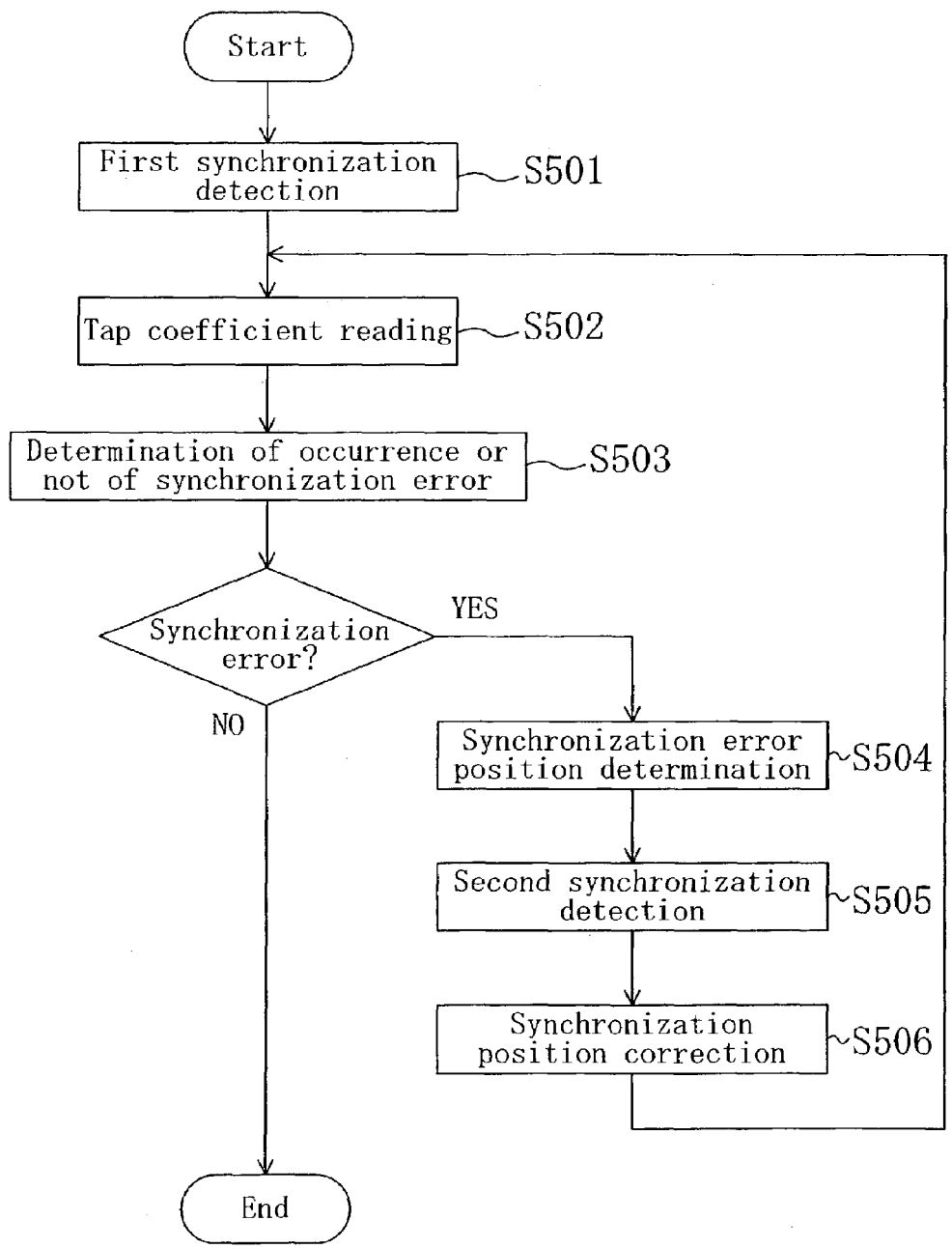
FIG. 18 is a flowchart of the digital demodulation device of Embodiment 5 of the present invention.
Figure 19:
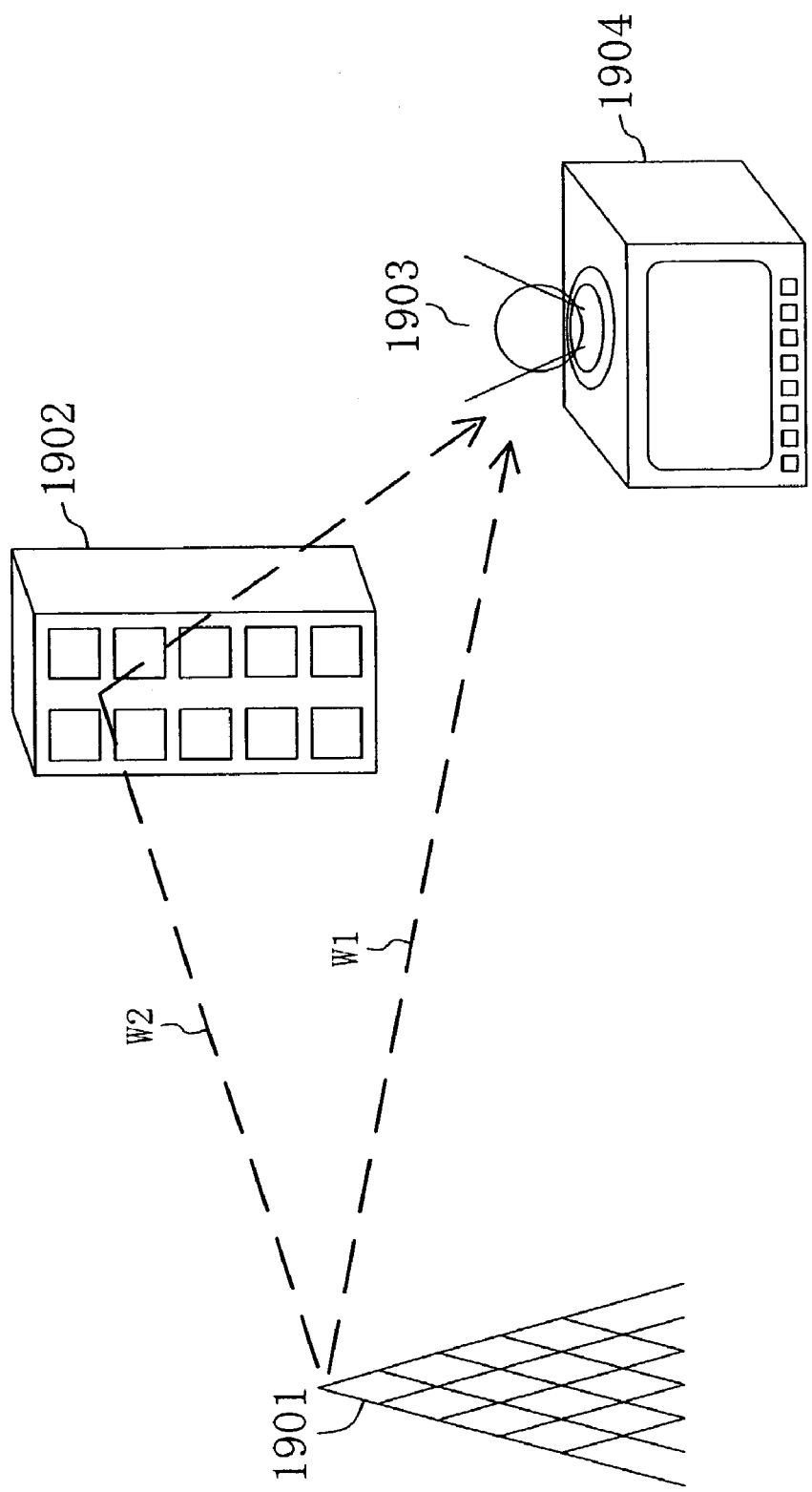
FIG. 19 is a view demonstrating multipath interference.

The operation of the digital demodulation device of this embodiment having the configuration described above will be described with reference to the flowchart of FIG. 18.

In step S501 (the step of first detecting a sync signal), the synchronization detector 1C detects the sync signal included in the received signal DT1. When succeeding in detection of the sync signal, the synchronization detector 1C outputs the sync timing signal DT2.

In step S502 (the step of reading), the controller 4D reads the tap coefficients DT6A of the center tap and nearby taps from the waveform equalizer 2. The wait time until convergence of the tap coefficients by the waveform equalizer 2 is as described in Embodiment 1.

In step S503 (the step of determining), whether or not the synchronization detector 1C has made a synchronization error is determined in the manner described in Embodiment 4. If it is determined that the synchronization detector 1C has made a synchronization error, the process proceeds to step S504. If the synchronization detection is determined correct, the process is terminated.

In step S504 (the step of determining a synchronization error position), the controller 4D estimates the displacement from the correct synchronization position, and outputs the control signal DT5A based on the estimated displacement. The estimation is performed as described in Embodiment 2.

In step S505 (the step of second detecting a sync signal), the synchronization detector 1D performs re-detection of the sync signal, so that a new sync signal can be detected at a new synchronization position indicated by the control signal DT5A, and outputs the control signal DT5B indicating success or not of the re-detection of the sync signal.

In step S506 (the step of correcting a synchronization position), the synchronization detector 1C corrects the synchronization error, and the process returns to step S502. Specifically, if the control signal DT5B output from the synchronization detector 1D indicates success of the re-detection of the sync signal, the synchronization detector 1C re-detects the sync signal at the new synchronization position indicated by the control signal DT5B. If the control signal DT5B indicates failure of the re-detection of the sync signal, the synchronization detector 1C does not perform re-detection but continues outputting the sync timing signal DT2 based on the sync signal detected in step S501.

As described above, in this embodiment, whether or not the new synchronization position indicated by the control signal DT5A from the controller 4D is the correct synchronization position is known from success or not of the re-detection of the sync signal performed by the synchronization detector 1D. The synchronization detector 1C may re-detect the sync signal based on the control signal DT5A only when the control signal DT5A is determined correct. This makes it possible to detect the correct synchronization position, and also avoid frequent re-detection of the sync signal by the synchronization detector 1C. Thus, intermittence of an output image is prevented.

The controller 4D determines whether or not the synchronization detector 1C has made a synchronization error, from the coefficients DT6A of the center tap and nearby taps. Alternatively, the determination may be made in a different manner. Also, the controller 4D generates the signal DT5A indicating a new synchronization position based on the coefficients DT6A of the center tap and nearby taps. Alternatively, the generation may be made in a different manner.

In the embodiments described above, a DTV signal modulated by the 8-VSB modulation scheme was used as the received signal DT1. Alternatively, a signal by another modulation method may be used. The present invention is effective for any device having a synchronization detector 1, 1a, 1b, 1A, 1B, 1C or 1D that is likely to make a synchronization error, irrespective of the modulation scheme of the received signal DT1.

According to the present invention, in the digital demodulation device for detecting synchronization of a received signal such as a DTV signal, whether or not a synchronization error has occurred can be determined. If it is determined that a synchronization error has occurred, re-detection of the sync signal is performed, to correct the synchronization error. In the re-detection of the sync signal, the correct synchronization position can be determined, and correction of the synchronization error can be made based on the displacement between the erroneous synchronization position and the correct synchronization position. By this re-detection of the sync signal, detection of the correct sync signal is ensured, and also the time required for the re-detection of the sync signal can be shortened.

In addition, re-detection of the sync signal may not be performed even if it is determined that a synchronization error has occurred as long as no problem arises in a TV output image. By this measure, intermittence of the output image due to re-detection of the sync signal is prevented.

While the present invention has been described in preferred embodiments, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A digital demodulation device comprising:
   a synchronization detector for detecting a sync signal included in a received signal and outputting a sync timing signal indicating the timing of the sync signal, the sync signal being composed of a plurality of symbols;
   a waveform equalizer having a transversal filter for performing waveform equalization of the received signal by updating coefficients of taps of the transversal filter regarding the timing of the sync timing signal as the position of a center tap; and
   a controller for receiving at least one of the coefficients of the taps and determining, based on the coefficient of the tap, whether or not the synchronization detector has made a synchronization error such that the synchronization detector captures a sync signal included in a delayed signal, the sync signal being composed of the plurality of symbols,
   wherein the controller instructs the synchronization detector to re-detect a sync signal when determining that the synchronization detector has made the synchronization error, and
   the synchronization detector re-detects a sync signal in response to the instruction from the controller.

2. The digital demodulation device of claim 1, wherein the controller receives the coefficients of the center tap and nearby taps, and, in instructing the synchronization detector to re-detect a sync signal, the controller estimates a displacement between the center tap and a maximum tap among the nearby taps of which the coefficient is the maximum, generates a signal indicating a new synchronization position based on the estimated displacement, and sends the signal to the synchronization detector, and
   the synchronization detector re-detects a sync signal based on the signal from the controller so that the sync signal is detected at the new synchronization position.

3. The digital demodulation device of claim 1, wherein the synchronization detector continues outputting the sync timing signal for at least a predetermined time period from start of the re-detection of a sync signal.

4. A digital demodulation device comprising
   a synchronization detector for detecting a sync signal included in a received signal and outputting a sync timing signal indicating the timing of the sync signal, the sync signal being composed of a plurality of symbols;
   a waveform eciualizer having a transversal filter for performing waveform equalization of the received signal by updating coefficients of taps of the transversal filter regarding the timing of the sync timing signal as the position of a center tap;
   a controller for receiving at least one of the coefficients of the taps and determining, based on the coefficient of the tap, whether or not the synchronization detector has made a synchronization error such that the synchronization detector captures a sync signal included in a delayed signal, the sync signal being composed of the plurality of symbols; and
   an error corrector for correcting a code error of the signal waveform-equalized by the waveform equalizer,
   wherein the controller compares the degree of occurrence of code errors found by the error corrector with a predetermined threshold, and instructs the synchronization detector to re-detect a sync signal if the degree of occurrence of code errors is greater than the predetermined threshold, and
   the synchronization detector re-detects a sync signal in response to the instruction from the controller.

5. The digital demodulation device of claim 4, wherein the controller receives the coefficients of the center tap and nearby taps, and, in instructing the synchronization detector to re-detect a sync signal, the controller estimates a displacement between the center tap and a maximum tap among the nearby taps of which the coefficient is the maximum, generates a signal indicating a new synchronization position based on the estimated displacement, and sends the signal to the synchronization detector, and
   the synchronization detector re-detects a sync signal based on the signal from the controller so that the sync signal is detected at the new synchronization position.

6. The digital demodulation device of claim 4, wherein the synchronization detector continues outputting the sync timing signal for at least a predetermined time period from start of the re-detection of a sync signal.

7. A digital demodulation device for detecting a sync signal included in a received signal and waveform-equalizing the received signal according to the timing of the detected sync signal, the device comprising:
   first and second synchronization detectors each for detecting the sync signal and outputting a sync timing signal indicating the timing of the detected sync signal; and
   a controller for selecting the sync timing signal output from one of the first and second synchronization detectors as a signal indicating the timing for the waveform equalization, and if determining that the selected signal includes a synchronization error, instructing the other of the first and second synchronization detectors to re-detect a sync signal, wherein the first and second synchronization detectors re-detect a sync signal in response to the instruction from the controller, respectively, and the controller newly selects a sync timing signal output from one of the first and second synchronization detector instructed to re-detect a sync signal as the signal indicating the timing for the waveform equalization when a sync timing signal is different in timing from the previously selected sync timing signal.

8. A digital demodulation device for detecting a sync signal included in a received signal and waveform-equalizing the received signal according to the timing of the detected sync signal, the device comprising:

a first synchronization detector for detecting the sync signal and generating a sync timing signal indicating the timing for the waveform equalization;

a second synchronization detector for detecting the sync signal; and a controller for generating a signal indicating a new synchronization position if determining that the sync timing signal includes a synchronization error, wherein the second synchronization detector re-detects a sync signal based on the signal from the controller so that the sync signal is detected at the new synchronization position, generates a signal indicating success or not of the re-detection, and sends the signal to the first synchronization detector, and the first synchronization detector re-detects a sync signal based on the signal from the controller so that the sync signal is detected at the new synchronization position when the signal from the second synchronization detector indicates success of the re-detection of a sync signal.

9. A synchronization detecting method comprising the steps of:

detecting a sync signal included in a received signal and generating a sync timing signal indicating the timing of the sync signal, the sync signal being composed of a plurality of symbols;

reading at least one of coefficients of taps of a transversal filter used, coefficients of the taps being updated using the timing of the sync timing signal as the position of a center tap to thereby waveform-equalize the received signal;

determining, based on the coefficient of the tap read in the step of reading, whether or not a synchronization error of capturing a sync signal included in a delayed signal has occurred in the step of detecting a sync signal, the sync signal being composed of the plurality of symbols; and correcting a synchronization position by re-detecting a sync signal if it is determined, in the step of determining, that the synchronization error has occurred in the step of detecting a sync signal.

10. The method of claim 9, wherein the step of reading comprises reading the coefficients of the center tap and nearby taps, the method further comprises the step of determining a synchronization error position by estimating a displacement between the center tap and a maximum tap having the maximum coefficient among the nearby taps, and the step of correcting a synchronization position comprises re-detecting a sync signal so that the sync signal is detected at a new synchronization position indicated by the displacement.

11. A synchronization detecting method comprising the steps of:

detecting a sync signal included in a received signal and generating a sync timing signal indicating the timing of the sync signal, the sync signal being composed of a plurality of symbols;

reading at least one of coefficients of taps of a transversal filter used, coefficients of the taps being undated using the timing of the sync timing signal as the position of a center tap to thereby waveform-equalize the received signal;

determining, based on the coefficient of the tap read in the step of reading, whether or not a synchronization error of capturing a sync signal included in a delayed signal has occurred in the step of detecting a sync signal, the sync signal being composed of the plurality of symbols;

counting the number of code errors during correction of the code errors of the waveform-equalized signal; and correcting a synchronization position by comparing the number of code errors with a predetermined threshold if it is determined, in the step of determining, that the synchronization error has occurred in the step of detecting a sync signal, and re-detecting a sync signal when the number of code errors is greater than the predetermined threshold.

12. The method of claim 11, wherein the step of reading comprises reading the coefficients of the center tap and nearby taps, the method further comprises the step of determining a synchronization error position by estimating a displacement between the center tap and a maximum tap having the maximum coefficient among the nearby taps, and the step of correcting a synchronization position comprises re-detecting a sync signal so that the sync signal is detected at a new synchronization position indicated by the displacement.

* * * * *